US012791521B2

(12) United States Patent
Shrivastava

(10) Patent No.: US 12,791,521 B2
(45) Date of Patent: *Nov. 10, 2026

(54) METHOD AND APPARATUS FOR DETERMINING A PROPERTY OF A TEST SUBSTANCE USING SURFACE WAVES ON A FLOWING LIQUID SYSTEM

(71) Applicant: Apoha Limited, London (GB)

(72) Inventor: Shamit Shrivastava, London (GB)

(73) Assignee: Apoha Limited, London (GB)

( * ) Notice: Subject to any disclaimer, the term of this patent is extended or adjusted under 35 U.S.C. 154(b) by 198 days.

This patent is subject to a terminal disclaimer.

(21) Appl. No.: 18/621,485

(22) PCT Filed: Dec. 21, 2022

(86) PCT No.: PCT/GB2022/053349

§ 371 (c)(1),
(2) Date: Mar. 29, 2024

(87) PCT Pub. No.: WO2023/118869

PCT Pub. Date: Jun. 29, 2023

(65) Prior Publication Data

US 2024/0272123 A1 Aug. 15, 2024

(30) Foreign Application Priority Data

Dec. 21, 2021 (GB) ...................................... 2118695

(51) Int. Cl.
*G01N 29/02* (2006.01)
*G01N 29/22* (2006.01)
*G01N 29/28* (2006.01)

(52) U.S. Cl.
CPC ......... *G01N 29/022* (2013.01); *G01N 29/222* (2013.01); *G01N 29/28* (2013.01);
(Continued)

(58) Field of Classification Search
CPC ............... G01N 29/022; G01N 29/222; G01N 2291/022; G01N 2291/0423
See application file for complete search history.

(56) References Cited

U.S. PATENT DOCUMENTS 3,970,804 A 7/1976 O'Brien et al.
6,407,479 B1 6/2002 Moellendorf et al.
(Continued)

FOREIGN PATENT DOCUMENTS

CN 1742097 A * 3/2006 ............... C12Q 1/04
CN 10749528 A 2/2020
(Continued)

OTHER PUBLICATIONS

European Search Report from EP24216282 dated Aug. 4, 2025.
(Continued)

*Primary Examiner* — Natalie Huls
(74) *Attorney, Agent, or Firm* — Woodard Emhardt Henry Reeves & Wagner LLP

(57) ABSTRACT

The present disclosure provides a method for determining a property of a test substance. The method may comprise first encoding the test substance as a wave through a non-solid medium by chemical excitation before processing the wave through the non-solid medium, wherein the processing modifies one or more features of the wave into one or more processed wave features according to one or more conditions of the non-solid medium. The one or more processed wave features are decoded to determine one or more features of the test substance.

20 Claims, 4 Drawing Sheets

(52) U.S. Cl.
CPC .................. *G01N 2291/022* (2013.01); *G01N 2291/0423* (2013.01)

(56) References Cited

U.S. PATENT DOCUMENTS

| | | | | |
|---|---|---|---|---|
| 6,999,953 | B2 | 2/2006 | Ovhsinsky | |
| 7,426,866 | B2 | 9/2008 | Van Tuyl et al. | |
| 8,940,538 | B2 | 1/2015 | Cho | |
| 2007/0068256 | A1 | 3/2007 | Xu et al. | |
| 2008/0141784 | A1 | 6/2008 | Murakami | |
| 2009/0226931 | A1 | 9/2009 | Bunch et al. | |
| 2011/0176133 | A1 | 7/2011 | Dang | |
| 2014/0147706 | A1 | 5/2014 | Choi et al. | |
| 2014/0211593 | A1 | 7/2014 | Tyler et al. | |
| 2024/0272123 | A1 | 8/2024 | Shrivastava | |
| 2024/0402129 | A1* | 12/2024 | Shrivastava | G01N 29/2418 |
| 2025/0164448 | A1 | 5/2025 | Borigo et al. | |
| 2026/0023011 | A1* | 1/2026 | Shrivastava | G01N 21/1717 |
| 2026/0029377 | A1* | 1/2026 | Shrivastava | G01N 29/022 |

FOREIGN PATENT DOCUMENTS

| | | | |
|---|---|---|---|
| CN | 107063923 | B | 3/2020 |
| CN | 112858112 | | 5/2021 |
| DE | 102014209862 | A1 | 11/2015 |
| GB | 2614078 | A | 6/2023 |
| GB | 2614079 | | 6/2023 |
| GB | 2614079 | A | 6/2023 |
| WO | WO 2004078996 | | 9/2004 |
| WO | WO2019/234437 | | 12/2019 |
| WO | WO 2019/234437 | A1 | 12/2019 |
| WO | WO 2020040509 | | 2/2020 |
| WO | WO 2023118870 | | 6/2023 |

OTHER PUBLICATIONS

FICHTL Protons at the speed of sound—Predicting specific biological signaling from physics.

GB2118692.9 Combined Search and Examination Report Jul. 14, 2022.

Kang Nonlinear pulses at the interface and its relation to state and temperature (1).

Macdonald Lipid monolayer states and their relationships to bilayers; Proc. Natl. Acad. Sci. USA vol. 84, pp. 4089-4093, Jun. 1987, Biophysics.

PCT/2022/053350 Written Opinion.

PCT/GB2022/053349 International Search Report.

PCT/GB2022/053349 Written Opinion.

PCT/GB2022/053350 International Search Report.

Scott et al. Evidence for long-term potentiation in phospholipid membranes; PNAS 2022 vol. 119 No. 50 p. 1-6.

Shrivastava—Evidence for two-dimensional solitary sound waves in a lipid controlled interface and its implications for biological signalling (non-linearity of system) J. of Royal Soc. Interface 2014.

Shrivastava Shock and detonation waves at an interface and the collision of action potentials, Progress in Biophysics & Molecular Biology 2021.

Shrivastava Opto-Mechanical_Coupling_in_Interfaces_under_Static and Propagative conditions and its Biological Implications; PLOS One, Jul. 2013 vol. 8, Iss. 7 e67524.

Beaglehole et al., ellipsometric study of the suvace of simple liquids, Physica B+C, North Holland Amsterdam, NL, vol. 100, No. 2 May 1, 1980.

Boubekri et al., MHz Ultrasound Induced Reoughness of Fluid Interfaces, Langmuir, vol. 32, No. 40, pp. 10177-10183.

Che et al., Soft Matter, 2018 14 1540; Impact of droplets on immiscible liquid films.

Cincotti, S et al., "Molecular microsystem for molecular processing of information", Proc of the 2nd Italian Conference on Sensors and Microsystems, pp. 104-108, Feb. 3-5, 1997, Rome.

GB 22106298 Dec. 21, 2024 combined search and examination report.

GB2210581.1 GB Combined Search Examination Report dated Jul. 5, 2023.

GB2210581.1 GB Combined Search and Examination Report dated Jul. 19, 2024.

Griesbauer et al Simultaneously Propagating voltage and Pressure Pulses in LIpd Monolayers of pork brain and synthetic lipids, Physical Review E Dec. 2012.

Griesbauer et al, Wave Prpoagation in Lipid Monolayers, Biophysical Journal vol. 97 Nov. 2009 2710-1716.

Heimburg et al., On the action potential as a propagating density pulse and the role of anesthetics, Biophysical Reviews and Letters vol. 2 No. 1 2007 57-78.

Hewitt, J, "Solitary acoustic waves observed to propagate at a lipid membrane interface", Phys. org, Jun. 20, 2014. Downloaded from https : //phys.org/news/2014-06-solitary-acoustic-propagatelipidmembrane.html on Oct. 23, 2018.

Kappler et al. Nonlinear frational waves at elastic interfaces, Mar. 1, 2017; Dept of Physics, Freie Univ. Berlin, Inst. of Biomedical Eng., Univ. of oxford, Dept of Physics TU Dortmond Germany; 12 pages.

Kaufmann K, Action Potentials and Electrochemical Coupling in the Macroscopic Chiral Phospholipid Membrane (Caruaru, Brasil). 1st Ed., 1989.

Klieber et al., "Optical generation and detection of gigahertz-frequency longitudinal and shear acoustic waves in liquids . . . ", J. Appl. Phys. AIP, vol. 112, No. 1, p. 13502, Jul. 1, 2012.

Li et al., "Granular acoustic switches and logic elements", Nature Communications vol. 5, 5311, 2014.

Meunier, Liquid interfaces: role of the fluctuations and analysis of ellipsometry and reflectivity measurements, Journal de Physique, Colloque, vol. 48 No. 10 Jan. 1, 1987.

PCT/GB2023/051903 International Search Report.

PCT/GB2023/051903 Written Opinion.

PCT/GB2023/051924 International search report.

PCT/GB2023/051924 written opinion.

Schneider et al., "Realization of spin-wave logic gates", Appl. Phys. Lett. 92, 022505, 2008.

Shrivastava et al., "Solitary shock waves and adiabatic phase transition in lipid interfaces and nerves", Physical Review E 91, 2015.

Shrivastava et al., Opto-Mechanical Coupling in Interfaces under Static and Propagative conditions and its Biological Imiplications, Jul. 14, 23 https://doi.org/10.1371/journal.pone.0067524.

Shrivastava S and Schneider M F, "Evidence for two-dimensional solitary sound waves in a lipid controlled interface and its implications for biological signalling", Journal of the Royal Society Interface, vol. 11, No. 97, 20140098, Aug. 6, 2014.

Shrivastava, "Non-linear Solitary Sound Waves in Lipid Membranes and Their Possible Role in Biological Signaling" Boston, Massachussets, USA: Thesis and Dissertation Collection 3917, 2014.

Steinbock et al., "Chemical Wave Logic Gates", J. Phys. Chem 1996, 100, 49.

Thuren et al., "Triggering of the activity of phospholipase A2 by an electric field", Biochemistry 1987, 26.

Tianhao Hou et al., Polymeric Liquid Layer Densified by Surface Acoustic wave, Arxiv.org, Cornell Univ. Libraty, 201 Olin Library Cornell University Ithaca NY 14853 Oct. 12, 2019.

UK Search Report for GB1809304.7, dated Oct. 26, 2018, pp. 1-5.

WO2019/234437 (PCT/GB2019/051577) Intemational Search Report & Written Opinion, dated Aug. 28, 2019, pp. 1-32.

Zhang et al., "Acoustic logic gates and Boolean operation based on self-collimating acoustic beams", Appl. Phys. Lett. 106, 113503, 2015.

Zhu et al., A Multi-IDT Input Tunable Surace Acoustic Wave Filter, IEEE Transactions on Ultrasonics, Ferroelectroics and frequency control vol. 48, No. 5 Sep. 2001, p. 1383-1388.

GB2210629.8 Aug. 6, 2024 examination report.

* cited by examiner

METHOD AND APPARATUS FOR DETERMINING A PROPERTY OF A TEST SUBSTANCE USING SURFACE WAVES ON A FLOWING LIQUID SYSTEM

FIELD OF INVENTION

The present invention is directed to an analytical method using surface waves to determine a property of a test substance and an analytical apparatus for performing an analytical method using surface waves to determine a property of a test substance.

BACKGROUND

Apparatuses used for the physical testing of substances and the measurement of physical parameters, such as the chemical composition of substances and/or the properties of molecules such as proteins and lipids, represents a very significant technical challenge. Prior methods of analysis such as chromatography, mass spectrometry and other types of analysis have severe shortcomings and are limited in that they are able to represent certain aspects of the test substances such as their mass to charge or the speed with which they move through a chromatography column but not other aspects.

The present disclosure relates to apparatus and methods which are able to characterise a stimulus, such as a test substance, in ways which have not previously been possible and so offer significant technical advantages in the analysis of such substances and in other technical fields.

SUMMARY

Aspects of the invention are set out in the independent claims and optional features are set out in the dependent claims. Aspects of the disclosure may be provided in conjunction with each other, and features of one aspect may be applied to other aspects.

The present disclosure provides methods and systems for encoding information in a medium in a liquid, gel, or other viscoelastic system. The medium may be a liquid, gel, or other viscoelastic medium. The medium may be non-solid. In some examples, the medium is not a solid or a gas.

An aspect of the disclosure provides a method for determining a property of a test substance comprising: (a) encoding the test substance as a wave through a non-solid medium by chemical excitation; (b) processing the wave through the non-solid medium, wherein the processing modifies one or more features of the wave into one or more processed wave features according to one or more conditions of the non-solid medium; and (c) decoding the one or more processed wave features to determine one or more features of the test substance.

Any sequential data can be given as an electrical input to a system as a voltage timeseries. Advantageously, the present disclosure may be used to manipulate excited waveforms to perform computation, particularly of timeseries classification (e.g. speech recognition) and prediction tasks, as a recurrent neural network does. The present disclosure may perform such computations with orders of magnitude better performance than conventional hardware.

Also, eluent coming out of a chromatography column may be arranged to impinge on a surface directly to generate waves, which in the present disclosure, may result in each droplet being recognized to perform the function of a high-performance liquid chromatography (HPLC) detector.

An aspect of the disclosure provides an analytical method using surface waves on a flowing liquid system for determining a property of a test substance, the analytical method comprising: contacting the surface of the flowing liquid system with the test substance thereby to generate a surface wave on the flowing liquid system; determining the property of the test substance based on a parameter of the surface wave.

In examples, the analytical method herein may permit identification of a property of a substance which may not be possible using conventional analytical methods. For example, the method may permit a degree of accuracy of the property of the substance which is unattainable using an identical quantity of the substance in a conventional method. For example, the method may permit a determination of the property of the substance which would be unattainable using an identical quantity of the substance in a conventional method.

Advantageously, a method of determining the property of the test substance based on a parameter of the surface wave may be provided.

Parameters of the surface wave may comprise any of: wavelength; frequency; wave speed; and amplitude. Amplitude herein may refer to: a change in surface density of particles at the surface of a liquid system (e.g. change in density of a lipid monolayer at the surface).

Determining the property of the test substance may be based on a plurality of parameters of the surface wave.

The flowing liquid system may comprise a bulk liquid phase. In examples, the properties of the bulk liquid phase may be selected to determine the properties of the surface waves generated by contacting a substance (e.g. a reference substance and/or a test substance) on the surface of the liquid system. For example, increasing the viscosity of the bulk liquid phase may change the speed of surface waves in the thin film.

The thin film may be a monolayer. For example, the monolayer may comprise a lipid thin film. The bulk liquid phase may comprise an aqueous phase. In examples, the lipid and/or the bulk liquid phase may be selected for determination of a particular property of a substance which generates a surface wave on the surface e.g. the lipid is selected based on the specific property of a test substance (e.g. viscosity) which a user wishes to determine using the analytical method.

The flowing liquid system may comprise material of the thin film dispersed in the bulk liquid phase, for example where the thin film is a lipid the lipid may also be dispersed in the bulk liquid phase. The lipid thin film may comprise a lipid which is the same as the lipid dispersed in the bulk liquid phase. The dispersed film material and the material in the thin film may be the same material or type of material, for example the lipid in the monolayer and the dispersed lipid may be the same species of lipid.

Advantageously, providing film material, such as a lipid, protein, or other molecule, dispersed in the bulk liquid phase permits an equilibrium to be established between the film material dispersed in the bulk liquid phase and that which is in the thin film, e.g. the lipid monolayer. Control of this equilibrium provides a way of controlling properties of the film.

The use of flowing liquid systems as described herein may provide a thin film (e.g. lipid, protein, or other molecule monolayer) which is refreshed after being contacted with a droplet of analyte before subsequent contact between another droplet of a substance and the surface. The presence of equilibrium between bulk phase and the thin film may provide enhanced stability in the properties of the film and hence reproducibility between one contact event and the next.

The liquid system need not flow i.e. the liquid system may be a static liquid system. Static systems can also be used. For example, a liquid system may be provided wherein the liquid system comprises a bulk liquid phase comprising an aqueous solution; a lipid dispersed in the bulk liquid phase; and, a lipid thin film carried at the surface of the bulk liquid phase. In such examples, an analytical method comprises: contacting the thin film of the liquid system with a first substance, wherein the thin film has an initial state, thereby to generate a first surface wave on the flowing liquid system; determining the property of the first substance based on a parameter of the first surface wave; controlling an equilibrium between the lipid thin film and the lipid dispersed in the bulk liquid phase to thereby return the lipid thin film to the initial state; subsequently, contacting the thin film of the liquid system with the a second substance, wherein the thin film has an initial state, thereby to generate a second surface wave on the flowing liquid system; determining the property of the second substance based on a parameter of the second surface wave. For example, the liquid system may comprise a spherical blob which floats in zero gravity or a microgravity environment.

Advantageously, a lipid monolayer may be provided which is identical (e.g. the same chemical composition) for a plurality of instances of contacting the surface with a droplet (e.g. of a test substance and/or a reference substance) without the need to provide a flowing liquid system.

The analytical method may comprise controlling an equilibrium between the lipid thin film and the lipid dispersed in the bulk liquid phase. Controlling an equilibrium between the lipid thin film and the lipid dispersed in the bulk liquid phase may comprise:

controlling at least one of:

(i) the temperature of the flowing liquid system;
(ii) the concentration of the lipid dispersed in the flowing liquid system;
(iii) the pH of the flowing liquid system;
(iv) the surface area of the lipid thin film.

Controlling an equilibrium between the lipid thin film and the lipid dispersed in the bulk liquid phase may comprise: maintaining a thin film parameter at a constant value, wherein the thin film parameter comprises any of:

(i) the surface pressure of the lipid thin film (TT);
(ii) the surface tension of the lipid thin film (y);
(iii) the surface concentration of the lipid thin film (I);
(iv) the surface potential of the lipid thin film (AV);
(v) the surface elastic modulus of the lipid thin film (E);
(vi) capacitance of the thin film;
(vii) heat capacity of the thin film.

In other words, the methods described herein may comprise controlling parameters of the thin film to test for the differences between the effect of contacting the surface with a reference substance and the effect of contact with a test substance. The circumstances of contact (e.g. the mechanical parameters of the contact event, such as the size and mass of any droplet and its velocity at contact) may also be controlled. In this way, any differences between surface waves generated by contact between the surface of the liquid system and, on the one hand the test substance and on the other hand the reference substance can be attributed to differences in the properties of the two substances themselves and not from differences in the surface of the liquid system.

The above parameters of the thin film (useful in controlling an equilibrium between the lipid thin film and the lipid dispersed in the bulk liquid phase) may be measured by optical techniques which may be sensitive to orientation of molecules at the surface. Such measurement methods may be particularly relevant to surface potential.

The flowing liquid system may be in a state of laminar flow. Advantageously, the laminar flow systems may require a lesser amount of computational work (e.g. work a process needs to do) to determine a parameter of a surface wave generated on the liquid system under laminar flow in comparison to the computational work required to determine a parameter of a surface wave generated on a liquid system under a non-laminar flow regime (e.g. under turbulent flow).

Determining a parameter of the surface wave generated by the contacting the surface of the flowing liquid system with the test substance may comprise: detecting, in a region R of the liquid system, a parameter of the surface wave generated by contacting the surface of the flowing liquid system with the test substance, wherein the region R is disposed either: upstream of the point on the surface of the flowing liquid system at which the surface is contacted with the test substance; or laterally with regards to the direction of flow from the point on the surface of the flowing liquid system at which the surface is contacted with the test substance.

Advantageously, in such arrangements waves generated at the position of the contacting means travel through an pure portion of the surface of the flowing liquid system to the region R where parameters of the wave are detected. In this way, differences between surface waves generated by contacting two different substances with the surface of the liquid system can be attributed to differences between the properties of the two substances themselves (e.g. different viscosities) and not from differences in the surface of the liquid system and, for example, the composition of the surface of the flowing liquid system (e.g. contamination of the surface from previous instances of contacting the surface with a test substance.

A pure portion of the surface refers to a portion of the surface which does not comprise substances from previous contacting of the surface by the contacting means.

The analytical method may further comprise: performing high-performance liquid chromatography, HPLC, on an analyte comprising a plurality of constituents, wherein one of the constituents is the test substance to thereby: obtain an HPLC parameter associated with the test substance; and, separate the test substance from the other constituents of the analyte; contacting the surface of the flowing liquid system with the test substance separated from the other constituents of the analyte to generate a test surface wave on the flowing liquid system; and, determining a property of the test substance based on the HPLC parameter and parameters of the surface wave.

Advantageously, more information about the test substance may be collected thereby permitting a more accurate determination of a property of the test substance.

The surface wave may comprise a longitudinal capillary wave (e.g. a Lucassen wave). In examples, the surface wave may comprise any of: a Rayleigh wave; a gravity wave; a capillary wave; and, a Lucassen wave. In practice, the different types of waves are coupled (e.g. generation of a Lucassen wave generates a capillary waves etc.) and, therefore, it may be difficult to isolate a parameter of a generated wave and determine it was generated solely by, for example, a Lucassen wave (e.g. the parameter may be a result of all of the fourwave types). However, there is no need to isolate parameters associated with a single type of wave (e.g. Lucassen wave) for the method and apparatus described here to work. For example, the present disclosure is concerned with identifying properties of a test substance based on parameter(s) of a generated surface wave (which may comprise all four types set out above superposed upon one another).

An aspect of the disclosure provides an analytical apparatus for determining a property of a test substance using surface waves comprising: a trough configured to hold a liquid system; a flow provider configured to provide a flow of the liquid system from an upstream end of the trough to a downstream end of the trough to thereby provide a flowing liquid system. Advantageously, a property of substance may be determined using the analytical apparatus.

In examples, the analytical apparatus may permit identification of a property of a substance which may not be possible using conventional analytical methods and apparatus. For example, the apparatus may permit a degree of accuracy of a property of the substance which is unattainable using an identical quantity of the substance in a conventional apparatus. For example, the apparatus may permit a determination of a property of the substance which would be unattainable using an identical quantity of the substance in a conventional apparatus.

The flow provider may be configured to provide a laminar flow of the liquid system. Advantageously, the laminar flow systems may require a lesser amount of computational work (e.g. work a process needs to do) to determine a parameter of a surface wave generated on the liquid system under laminar flow in comparison to the computational work required to determine a parameter of a surface wave generated on a liquid system under a non-laminar flow regime (e.g. under turbulent flow).

The trough may be configured to hold a liquid system so that a contacting means can contact the surface of the liquid system with the test substance.

The analytical apparatus may comprise a detector.

The detector may be configured to detect a parameter of a surface wave generated by contacting the surface of the flowing liquid system with a test substance.

The detector may be configured to detect a parameter of a surface wave generated by contacting the surface of the flowing liquid system with a test substance for determining the property of the test substance based on the parameter of the surface wave.

A contacting means may be provided configured to contact the surface of the flowing liquid system with the test substance. Advantageously, a contacting means may permit reproducible measurements to be obtained e.g. by contacting a similar quantity of a substance in a similar manner onto the surface. Therefore, all variables other than the property of the substance may be controlled. As a result, direct comparison of parameters of different surface waves generated by contacting the surface with different substances may be permitted.

The contacting means may be configured to: generate a droplet of the test substance at an outlet of the contacting means; and, move the outlet of the outlet of the contacting means toward the surface of the flowing liquid system to thereby bring into contact the droplet of the test substance and the surface.

The contacting means may be configured to: generate a droplet of the test substance at an outlet of the contacting means; wherein, in use, the outlet of the contacting means is spaced from the surface of the flowing liquid system so that, in the event that a droplet is generated at the outlet, part of the droplet contacts the surface.

The contacting means may permit a droplet of a test substance (or in examples, a reference substance) to be brought into contact with the surface of the flowing liquid system. Advantageously, contacting the surface with a droplet rather than dropping the surface can avoid disadvantages associated with dropping the droplet on the surface. A disadvantage with dropping a droplet onto the surface of the liquid system (compared to contacting a surface of a liquid system with a droplet) is that the dropped droplet may rebound thereby generating a plurality of waves which may require a greater amount of computational work to determine parameter of the generated waves and/or a property of the dropped substance which generates the wave.

The contacting means may comprise a liquid dispenser having a conduit for delivering a liquid to the flowing liquid system. The conduit may be sized and arranged, relative to the trough, for delivering droplets of the liquid to the surface of the flowing liquid system. The contacting means may be implemented by the use of any such mechanisms or by the use of any similar mechanism capable of delivering droplets.

The contacting means may be made and sold separately. For example, the analytical apparatus may be sold for use with an HPLC column but sold separately from the column itself. In such a case the output of the HPLC column may provide the "contacting means". In other words the analytical apparatus itself need not comprise the contacting means but is still capable of determining a property of a test substance using surface waves.

The trough is configured to hold a liquid system comprising: a bulk liquid phase; a lipid dispersed in the bulk liquid phase; and, a lipid thin film carried at the surface of the bulk liquid phase; and, the analytical apparatus comprises: an equilibrium control means configured to control an equilibrium between the lipid thin film and the lipid disposed in the bulk liquid phase.

The parameter may be referred to as an indication. For example, a parameter associated with a wave generated by a test substance (e.g. a test wave) may be indicative of the test substance and may be referred to as an indication (e.g. a test indication). Similarly, a parameter associated with a wave generated by a reference substance (e.g. a reference wave) may be indicative of a the reference substance (e.g. a reference indication).

Obtaining the reference indication may comprise contacting the surface of the liquid system with the reference substance; and/or, retrieving the reference indication from a database. Obtaining the test indication may comprise contacting the surface of the test system with the test substance.

Reference indications and test indications may be treated as vector quantities (e.g. feature vectors).

A property of the test substance may be determined based on the reference indication and the test indication and may comprise determining a difference measure (e.g. a Euclidean distance metric; a vector quantity) between the reference indication and the test indication. For example, the difference measure may be determined by a subtraction between the reference indication and the test indication. Embodiments of the present disclosure can comprise data processors configured to determine the test indication by calculating a feature vector for a test substance based on the surface wave (or waves) associated with contact between that test substance and the flowing liquid system. Such a feature vector may comprise any one or more of the parameters of the surface wave described herein and/or a time series corresponding to the measured wave itself (e.g. a waveform).

Calculating the feature vector may comprise the data processor performing a dimensionality reduction on that measured data. Other data may also contribute to such a feature vector, such as, for example, an indication of a quantity of the test substance delivered to the surface and/or an indication of the flow rate(s) at which the surface wave(s) has (have) been observed. Examples of methods used for dimensionality reduction include, but are not limited to, orthogonalization, singular value decomposition (SVD), and principal component analysis (PCA) and other methods. The reference indication may be based on the same calculations.

The difference measure may comprise interference of surface waves e.g. generating both a reference surface wave and a test surface waves on the surface simultaneously and recording the interference patterns on the surface. In such examples, the interference patterns may be indicative of the specific reference substance and test substance and, therefore, may be used to identify either the combination of the substances or the test substance.

The property of the test substance may comprise at least one of:

(1) the partition coefficient, wherein the partition coefficient is the ratio of the concentration of the test substance in the lipid phase and aqueous phase;
(2) the viscosity of the test substance;
(3) the charge of the test substance;
(4) the solubility of the test substance in the liquid system;
(5) the chemical potential per mol of the test substance;
(6) the enthalpy of interactions between the test substance and the liquid system;
(7) the identity of the test substance;
(8) the enthalpy of transition for conformational degrees of freedom of the test substance;
(9) the hydrophobicity of the test substance
(10) the hydrodynamic radius of the test substance
(11) the interfacial free energy of the test substance
(12) the thermodynamic susceptibilities of the test substance.

The analytical method may comprise: performing high-performance liquid chromatography, HPLC, on an analyte comprising a plurality of constituents, wherein one of the constituents is the test substance to thereby: obtain an HPLC parameter associated with the test substance; and, separate the test substance from the other constituents of the analyte; contacting the surface of the flowing liquid system with the test substance separated from the other constituents of the analyte to generate a test surface wave on the flowing liquid system; and, determining a property of the test substance based on the HPLC parameter and the test indication.

Although examples herein refer to the liquid system moving under a laminar flow regime, a turbulent flow regime may be used. However, turbulent flow regimes may require a greater amount of computational work (e.g. work a processor needs to do) to determine parameters of surface waves generated on the flowing liquid system.

In examples, the method may comprise providing a plurality of droplets (e.g. of reference substance or test substance) in sequence to the surface of the flowing liquid system without performing an intermediate step of controlling an equilibrium between the lipid thin film and the lipid dispersed in the bulk liquid phase. Advantageously, the total quantity of the reference substance or test substance which contacts the surface may be increased which may increase the sensitivity of the apparatus.

In examples, the speed of the flow of the liquid may be reduced thereby causing accumulation of test substance to permit measurement of the test substance (e.g. a plurality of test droplets may be contacted onto the surface wherein each test droplet comprises a small amount of the test substance and providing a plurality of droplets to the surface thereby increases the total amount of the test substance on the surface of the liquid system). For example, if the surface of the liquid system (e.g. a lipid monolayer) is flowing at speed V under a continuous stream of droplets of N droplets per second, then the deposition rate of droplets onto the surface is related to N/V per second. The speed of the surface of the liquid system may be reduced to V/2 thereby changing the deposition rate to 2N/V, thereby comparatively increasing the sensitivity of the method.

In some examples, the speed of the flow of liquid may be stopped to thereby increase the sensitivity of the method.

In examples, the equilibrium control means may comprise a heater configured to heat the liquid system disposed in the trough.

The equilibrium control means may comprise a liquid system dispenser configured to dispense liquid into the trough. In examples, the equilibrium control means may comprise a secondary liquid system dispenser configured to dispense a liquid into the trough. For example, the secondary liquid system dispenser may be configured to dispense a liquid which is different from at least one of the aqueous phase and the lipid monolayer. For example, the secondary liquid system dispenser may be configured to dispense an acid into the trough to thereby adjust the pH of a liquid system disposed in the trough.

In examples, the equilibrium control means comprises a surface area changing means configured to change the surface area of a lipid thin film.

An aspect of the disclosure provides use of an analytical apparatus described herein to perform any of the analytical methods described herein.

The state of the monolayer may depend on: temperature, pH, lipid-type, ion or protein adsorption to the monolayer, solvent incorporation of the monolayer, isothermal compressibility. In examples, any of the pH, ions adsorption and/or protein adsorption may be controlled by changing the bulk liquid phase (e.g. referred to as a fluid buffer) beneath the lipid monolayer. In examples, any of the pH, ions adsorption and/or protein adsorption may not be controlled directly but rather these parameters of the state of the monolayer be observed and then accounted for in calculations to determine a property of the test substance.

The determined the property of the test substance may be used to identify the test substance (e.g. by comparing the determined the property with a table of compounds and their associated that particular property).

The initial thin film parameters may not be restored and the surface may be contacted with the same test substance a plurality of times. Advantageously, a greater quantity of the test substance is contacted with the surface which may increase the magnitude of a parameter of a wave generated by contacting the test substance with the surface. In this manner, the accuracy of the determine the property of the substance may be increased (in comparison to using a single droplet of the test substance).

An aspect of the disclosure provides an analytical method using surface waves on a liquid system for determining a property of a test substance, the analytical method comprising: generating a droplet of the test substance; contacting the surface of the liquid system with the droplet of the test substance thereby to generate a surface wave on the liquid system; determining the property of the test substance based on a parameter of the surface wave. The droplet of the test substance may be generated by any of the following methods: nebulization (e.g. using a nebulizer); cross-flowing droplet formation; flow focusing droplet formation; co-flowing droplet formation.

The liquid system may be a flowing liquid system.

DRAWINGS

Embodiments of the disclosure will now be described, by way of example only, with reference to the accompanying drawings, in which.

Like reference signs between the Figures illustrate like elements.

DESCRIPTION

The present disclosure relates to methods and apparatus for determining a property of a test substance based on parameters of a surface wave generated in a liquid system by contacting a surface of the liquid system with the test substance. Methods of contacting the surface and controlling the surface are also disclosed.

The liquid system may comprise a dispersion of solid particles, such as a network of particles dispersed in the liquid, which may provide a colloid for example a gel. For example, the bulk liquid phase and/or any thin film at its surface may comprise such a dispersion. The bulk liquid phase and/or any thin film at its surface may be viscoelastic.

The surface of the liquid system forms a boundary or interface with any adjacent medium, typically air or another gas. The liquid system generally comprises a bulk liquid, which may be aqueous, and a thin film such as a lipid monolayer carried at a surface of the bulk liquid system. The interface between the bulk liquid and the lipid monolayer may be referred to as a lipid interface.

The methods described herein can be performed using a Langmuir trough holding such a liquid system. A contacting means can be used to cause contact between a test substance and the surface of the liquid system, e.g. the external surface of the thin film. In addition to any mechanical wave generated by the contact, an electromechanical interaction between the substance and the lipid monolayer gives rise to additional waves such as Lucassen waves on the surface of the liquid system. A detector is used to measure a parameter of this surface wave. The measured parameter is compared to reference data to determine a property of the test substance. The reference data may comprise a plurality of entries wherein each entry comprises an association between the parameter and the property. Each such entry may also be associated with a different reference substance (e.g. known substance) with a known the property. The reference data may comprise a stored association such as this, or may be obtained by experiment.

Figure 1A:
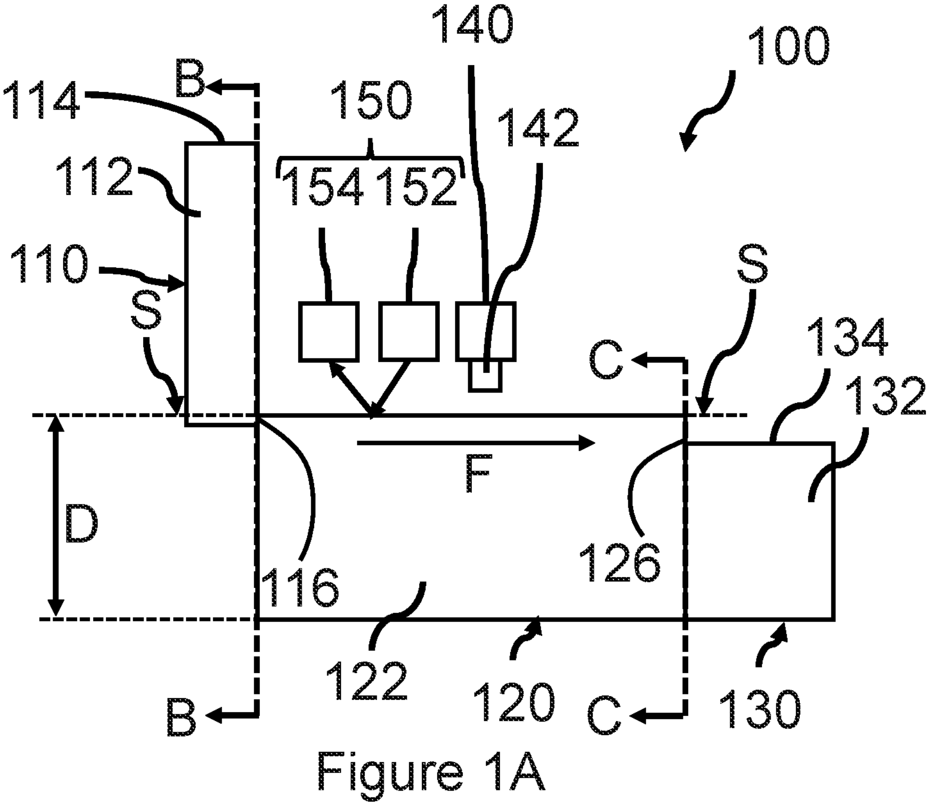
FIG. 1A illustrates a side view of an analytical apparatus for performing an analytical method.
Figure 1B:
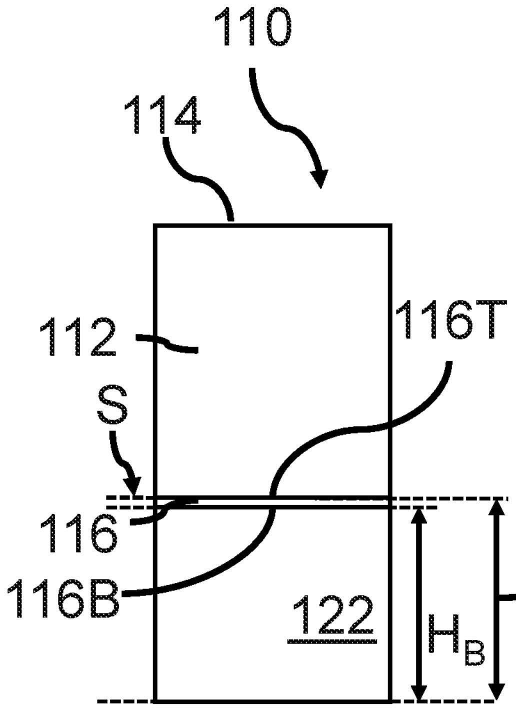
FIG. 1B illustrates a cross-sectional view along plane B-B of the analytical apparatus shown in FIG. 1A.
Figure 1C:
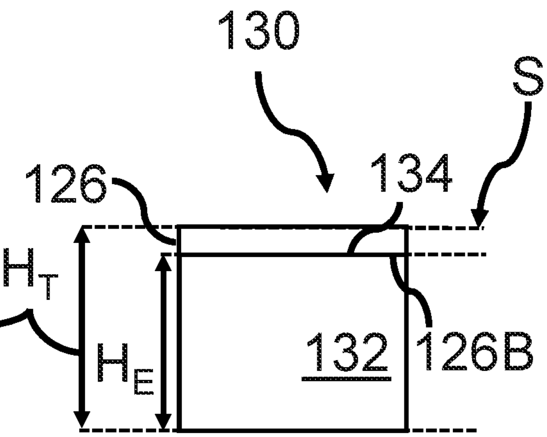
FIG. 1C illustrates a cross-sectional view along plane C-C of the analytical apparatus shown in FIG. 1A.
Figure 7:
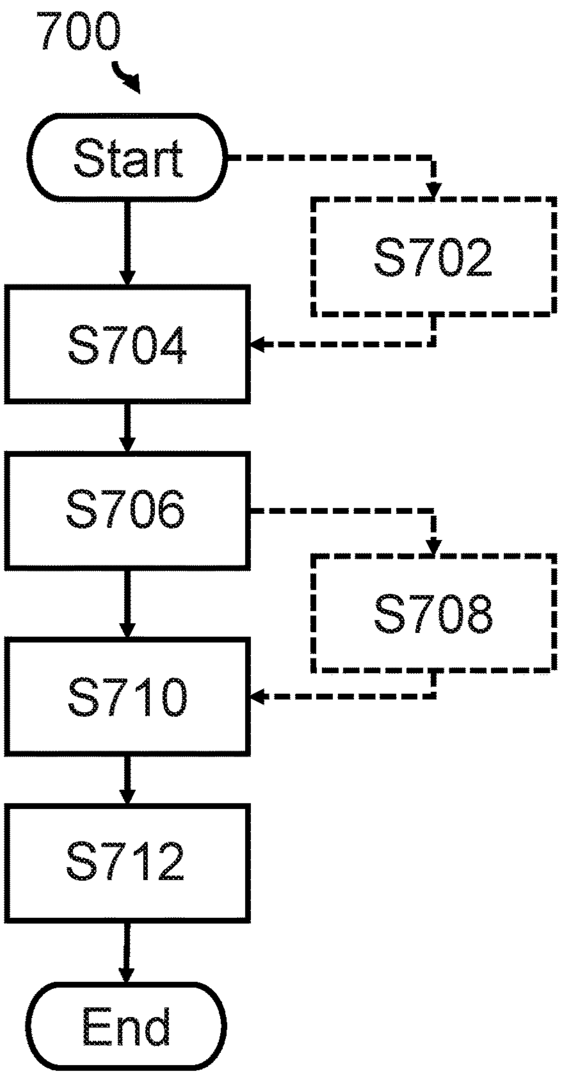
FIG. 7 illustrates an analytical method using the liquid system of FIG. 6.

FIG. 1A illustrates a side view of an analytical apparatus for performing an analytical method, for example at least one of the analytical methods depicted in FIG. 7, 8 or 10. FIG. 1B illustrates a cross-sectional view of plane B-B of the analytical apparatus shown in FIG. 1A. FIG. 1C illustrates a cross-sectional view of plane C-C of the analytical apparatus shown in FIG. 1A.

The analytical apparatus 100 comprises: a liquid system dispenser 110; a trough 120; a liquid system receiver 130; a contacting means 140; a detector 150.

The liquid system dispenser 110 comprises: a liquid system dispenser vessel 112; a liquid system dispenser inlet 114; and, a liquid system dispenser outlet 116. Liquid can pass through the liquid system dispenser inlet 114 to enter the liquid system dispenser vessel 112. Liquid can exit the liquid system dispenser vessel 112 through the liquid system dispenser outlet 116. The liquid system dispenser outlet 116 comprises a slit disposed between a slit bottom edge 116B and a slit top edge 116T. The liquid system dispenser inlet 114 is arranged at a top side of the liquid system dispenser. The liquid system dispenser outlet 116 is disposed closer to a bottom side than the top side of the liquid system dispenser 110. The liquid system dispenser outlet 116 is arranged in fluid communication with the trough 120.

In some examples, the liquid system dispenser inlet may be disposed in the bottom side of the liquid system dispenser The trough 120 comprises a bottom and sides which define an interior volume 122. The interior volume 122 of the trough 120 is configured to hold a liquid (e.g. a liquid system such as any of those described herein). The trough has a trough outlet 126. The trough outlet is configured to allow the liquid (e.g. a liquid system) held in the trough to exit the trough. The interior volume 122 is arranged in fluid communication with the trough outlet 126. The trough outlet 126 is a portion of the wall of the trough with an edge 126E which is shorter in height than the other walls of the trough. Liquid exits the interior volume 122 when the depth of the liquid exceeds the height of the edge 126E. The trough outlet 126 is disposed at a height $H_E$ from the bottom of the trough 120. The other walls of the trough have a height greater than the height of the trough outlet 126. The trough outlet 126 is arranged in fluid communication with the liquid system receiver 130

The liquid system receiver 130 is a receptacle for receiving liquid system which exits the trough. In examples, the liquid system receiver may be omitted or may be separate from the apparatus comprising the liquid system dispenser and the trough.

The contacting means 140 comprises a contacting means outlet 142.

The contacting means 140 is disposed above the trough 120. The contacting means 140 can be moved toward the trough 120 to thereby contact a surface of liquid in the trough with a substance carried by the contacting means. Put in other words, the contacting means 140 is disposed above the trough 120 (e.g. when the system 100 is disposed on a flat horizontal surface for use). In other words, the contacting means 140 is disposed in a direction perpendicular to a surface of a liquid system held in the trough 120. The contacting means is configured to permit the contacting means to move a droplet of a substance (e.g. a test substance and/or a reference substance) into contact with a surface of a liquid system disposed in the trough.

The detector 150 comprises: a light source 152; and, a light detector 154. The detector 150 is configured to detect a parameter of a surface wave of a liquid system disposed in the trough.

The light source 152 is arranged to direct light onto a surface of a liquid system held in the trough 120. The intensity of the light reflected at a given location on the surface of the liquid system depends on the polarization and angle of incidence at the surface and on the density and orientation of molecules at the surface (e.g. lipid molecules), which determine the dielectric properties of the surface. For example, the magnitude of the reflected light at a given point on the surface for a fixed angle of incidence and polarisation is increased when the lipid density at the given point is greater and the magnitude is reduced when the lipid density is comparatively lesser at the given point. The light detector 154 is arranged to receive reflected light from the surface of a liquid system held in the trough 120 (e.g. wherein the reflected light is generated by light emitted from the light source 152 onto the surface of the liquid system). The light source 152 and the light detector 154 are disposed above the trough 120. The light source 152 is configured to emit light e.g. the light source is configured to emit light onto a surface of a liquid system held in the trough. The light source 152 is configured to emit polarized light. The light detector 154 is configured to detect light e.g. the light detector is configured to detect reflected light from a surface of a liquid system held in the trough. The foregoing means of measuring waves optically in an ellipsometric manner. Other example means of measuring the waves include interferometric and/or holographic means.

The optical detector 150 is configured to determine the parameters of the wave (e.g. any of amplitude, wavelength, frequency or wave speed).

The liquid system dispenser 110 is configured to dispense a liquid system into the trough 120. The liquid system dispenser 110 is configured to hold a liquid system in the liquid system dispenser vessel 112. The liquid system dispenser vessel 112 is configured to receive liquid system via the liquid system dispenser inlet 114. The liquid system dispenser vessel 112 is configured to dispense liquid system via the liquid system dispenser outlet 116.

The trough may hold a liquid system and the liquid system dispenser may hold and dispense the same liquid system. In such examples, the liquid dispenser may serve to replenish the liquid system which is exits the trough and flows into the liquid system receiver.

The trough may be a Langmuir trough. The trough has a width e.g. the dimension perpendicular to a flow direction (represented by arrow F) of the flowing liquid system. The width is selected to be greater than the wavelength of surface waves generated by contacting a substance with the surface of a liquid system disposed in the interior volume trough. Such an arrangement may avoid undesired wave mechanics (e.g. diffraction; reflection; self-interference) which might complicate the generated surface waves. Complicating the generated surface waves can be undesirable because doing so may increase the computational work required to determine one or more parameters of the surface waves and/or to determine a property of the substance which generates the wave.

In examples, the wavelengths of surface waves generated by contacting a substance with the surface of a liquid system disposed in the trough vessel will be on the order of a millimetre ($10^{-3}$ m) to the order of a centimetre ($10^{-2}$ m). Advantageously, a trough vessel with a width on the order of decimetres ($10^{-1}$ m) may be provided to thereby negate or avoid the aforementioned problems but without unnecessarily increasing the size of the analytical apparatus.

The contacting means 140 is configured to contact a surface of a liquid system held in trough 120 with a droplet of a substance of interest. The contacting means 140 may be configured to operate in the same manner as either: the example shown in FIGS. 2A to 2C; or, the example shown in FIGS. 4A to 4D In the example shown in FIGS. 2A to 2C, the contacting means is configured to: form a droplet of a substance (e.g. a reference substance and/or a test substance) at the contacting means outlet; and, move the contacting means outlet toward the surface of the flowing liquid system to thereby bring into contact the droplet and the surface.

In examples, such as the arrangement illustrated in FIGS. 4A to 4D, the contacting means is configured to: form a droplet of a substance (e.g. a reference substance and/or a test substance) at an outlet of the contacting means; wherein, in use, the outlet of the contacting means is spaced from the surface of the flowing liquid system so that, in the event that a droplet is formed at the outlet, part of the droplet contacts the surface.

A detailed description of both contacting means and methods of contacting a droplet (e.g. of a test substance or reference substance) with a surface of a liquid system is set out below with reference to FIGS. 2A to 2C, FIG. 3, FIGS. 4A to 4D and FIG. 5.

The apparatus is configured so that the liquid system flows from an upstream end (e.g. where the liquid system dispenser is disposed) to a downstream end (e.g. where the liquid system receiver is disposed). The detector 150 is disposed upstream of the contacting means 140 e.g. a region R of the liquid system where the detector detects a parameter of a surface wave generated by contacting a surface of the liquid system with a test substance. Advantageously, waves generated at the position of the contacting means travel through a pure portion of the surface of the flowing liquid system to the region R where parameters of the wave are detected. In this way, the only differences between surface waves generated by contacting two different substances with the surface of the liquid system will arise from differences in the two substances (e.g. different viscosities) and not from differences in the surface of the liquid system and, for example, the composition of the surface of the flowing liquid system.

A pure portion of the surface refers to a portion of the surface which does not comprise an substances from previous contacting of the surface by the contacting means.

In examples, the detector may be disposed laterally with regards to the direction of flow from the point on the surface of the flowing liquid system at which the surface is contacted with the test substance (e.g. the region R may be disposed laterally to the direction of flow).

When the liquid system comprises a lipid monolayer, a generated wave in the lipid monolayer results in variations of the charge density on the surface which effect the polarisation of the reflected light. The effect on the polarisation of the reflected light may be indicative of a property of the substance which generates the surface wave (e.g. the amount of charge of the substance). In examples, the polarization of light is a secondary sensing mechanism. The point on the lipid monolayer where the light polarization is being measured is spatially removed (e.g. spatially distant) from the point on the surface where the droplet is deposited. The surface wave(s) generated by contacting the droplet (e.g. of test substance) travels orders of magnitude faster than the droplet diffusion (e.g. diffusion of the test substance throughout the liquid system). Therefore, the change in surface density, and dipole orientation of lipids at the wavefront is purely due to the wave excited by the chemical but not the chemical itself. By measuring the changes in the polarisation of light the amplitude of the surface wave may be determined. The amplitude is related to, for example, the enthalpy released by the chemical as discussed herein.

In examples, the trough may comprise an equilibrium control means configured to control an equilibrium between a lipid thin film carried on a bulk liquid phase and a lipid dispersed in the bulk liquid phase (e.g. wherein the lipid thin film and the lipid dispersed in the bulk liquid phase are the same species). Controlling the equilibrium between the lipid thin film and the lipid dispersed in the bulk liquid phase comprises controlling at least one of: the temperature of the flowing liquid system; the concentration of the lipid dispersed in the flowing liquid system; the pH of the flowing liquid system; the surface area of the lipid thin film.

In examples, the equilibrium control means may comprise any of: the liquid system dispenser configured to dispense at least one component of the liquid system (e.g. an aqueous phase and/or a lipid thin film) into the trough; a secondary liquid system dispenser configured to dispense a substance which is not a component of the liquid system into the trough (e.g. not the aqueous phase and not the lipid thin film); a surface area changing means configured to change the surface area of the lipid thin film disposed on the bulk liquid phase (e.g. aqueous phase); a heater configured to heat the liquid system disposed in the trough.

A flow provider is provided by the liquid system dispenser 110 and the trough outlet 126 (e.g. the liquid system dispenser and the trough outlet are configured to be operable as a flow provider). The flow provider provided by the liquid system dispenser 100 and the trough outlet 126 may be described as a passive flow provider because, after some initial conditions have been satisfied (e.g. the liquid system dispenser is loaded with liquid system), a flowing liquid system will be provided without any further external input (until the liquid system dispenser depletes the liquid system loaded therein).

The liquid system dispenser outlet 116 comprises a bottom edge 116B and a top edge 116T defining a slit therebetween. The top edge 116T of the liquid system dispenser outlet 116 is disposed at a height $H_T$ from a bottom of the trough vessel 122. The bottom edge 116B is disposed at a height $H_B$ from the bottom of the trough vessel 122. The height $H_B$ is less than the height $H_T$; $H_B<H_T$. The slit has a width (e.g. the shortest distance between any point on the bottom edge 116B and the top edge 116T) of $H_T$-$H_E$.

The trough outlet 126 comprises an opening in a wall of the trough 120. The opening in the wall of the trough is characterised by a trough outlet edge 126E e.g. a portion of the wall of the trough has an edge which is shorter than the other walls of the trough. The trough outlet edge 126E is disposed at a height $H_E$ from the bottom of the trough vessel 122. In examples, the remainder of the edge of the trough has a height of at least $H_B$, that is, the height of liquid system dispenser bottom edge 116B. The height $H_E$ is less than the height $H_B$ of the liquid system dispenser bottom edge 116B from the bottom of the trough vessel 122; $H_E<H_B$.

To establish a flowing liquid system, the interior volume of the trough 122 is provided with the liquid system to a depth D i.e. the shortest distance between a surface S of the liquid system and the bottom of the trough is D.

The depth D is variable. The depth D is variable between the height $H_T$ of the top edge 116T of the liquid system dispenser outlet 116 and the height $H_E$ of the trough outlet edge 126E.

In the event that the depth D of the liquid system is greater than the height $H_E$ of the trough outlet edge 126E then the liquid system flows over the trough outlet edge 126E into the liquid system receiver 130.

In the event that the depth D of the liquid system is less than the height $H_T$ of the top edge 116T of the liquid system dispenser outlet 116 then the liquid system flows through the slit defined by the top edge 116T and the bottom edge 116B into the interior volume 122 of the trough.

The flow rate $Q_i$ of the liquid system into the trough 120 (i.e. the flow rate of the liquid system out of the liquid system dispenser 110 via the liquid system dispenser outlet 116) depends on the difference between the liquid system depth D and the height of the top edge 116T of the liquid system dispenser outlet 116. The flow rate $Q_i$ of the liquid system out of the liquid system dispenser 110 via the liquid system dispenser outlet 116 depends on the slit width.

The flowrate $Q_o$ of the liquid system out of the trough 120 via the trough outlet 126 depends on difference between the liquid system depth D and the height of the trough outlet edge 126E.

Herein the term flow rate refers to a volume of liquid system passing into or out of a particular element per unit time e.g. the flow rate may be measured in units of $m^3s^{-1}$.

A steady flow state of the flowing liquid system (e.g. constant flow speed with no net loss of liquid system from the trough) is obtained when the flow rate $Q_i$ of the liquid system into the trough 120 is equal to the flow rate $Q_o$ of the liquid system out of the trough 120; $Q_i=Q_o$.

Advantageously, providing a flowing liquid system with a laminar flow state may require less computational work (e.g. resources; time) to determine one or more parameter of a generated surface wave and/or to determine a property of the substance which generates the surface wave.

The arrangement illustrated in FIGS. 1A to 1C advantageously provides a passive self-regulating flow provider is provided thereby reducing the complexity of the analytical apparatus. Advantageously, a laminar flow may be provided (e.g. when a steady flow state has been achieved).

The speed of a notional fluid particle in the steady state may be on the order of 0.1 $ms^{-1}$. Advantageously, providing a speed on the order of 0.1 $ms^{-1}$ may provide a laminar flow.

In examples, a turbulent flow may be used. However, when a turbulent flow is used the computational work required to determine one or more parameters of generated surface waves and/or to determine a property of the substance which generates the surface wave is increased in comparison to the computational work required to determine the same when a laminar flow is used.

In examples, another type of flow provider (e.g. a pump or any fluid mover) may be provided configured to provide a flowing liquid system (e.g. a laminar flow). A flow provider (e.g. a pump) which requires an continuous external input (e.g. electrical power) to thereby provide a flowing liquid system may be referred to as an active flow provider.

In examples, in use, a trough may be disposed at an angle (e.g. obliquely) to a horizontal surface (e.g. a tabletop)

thereby defining an upper end of the trough and a lower end of the trough. A liquid system dispenser is disposed at the upper end of the trough. The liquid system dispenser is configured to provide liquid (e.g. a liquid system) to the upper end of the trough. A flowing liquid system is provided as a liquid system enters the upper end of the trough, then flows towards the bottom end of the trough.

Figure 2A:
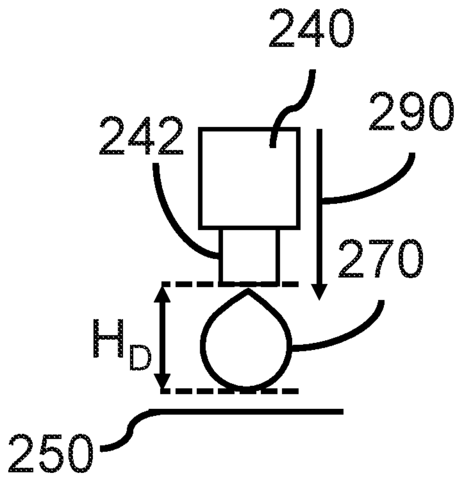
FIGS. 2A to 2C illustrate perspective side views of a contacting means, wherein the Figures illustrate a sequence of perspective side views of the contacting means generating a droplet and contacting a surface of a flowing liquid system with the droplet.
Figure 2B:
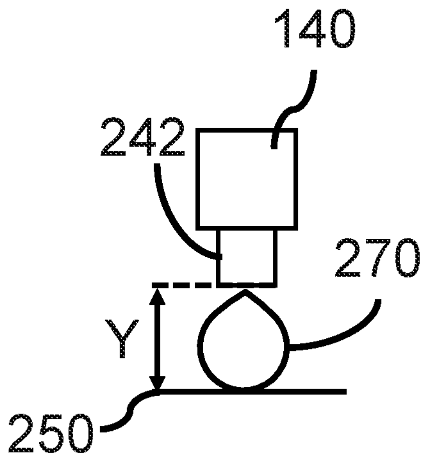
Figure 2C:
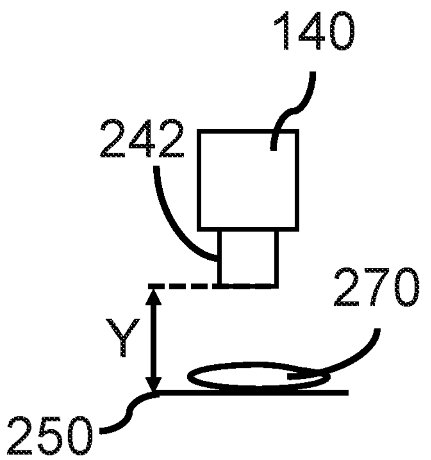

FIGS. 2A to 2C illustrate perspective side views of a contacting means 240. FIGS. 2A to 2C illustrate a sequence of perspective side views of the contacting means 240 generating a droplet 270 and contacting a surface 250 of a flowing liquid system with the droplet 270.

The droplet 270 may comprise a reference substance or a test substance.

FIG. 2A illustrates a contacting means outlet 242 of a contacting means 240 moving toward the surface 250; the relative movement of the contacting means outlet 242 relative to the surface 250 is represented by arrow 290. As shown in FIG. 2A the droplet 270 is formed at the contacting means outlet 242 before (or as) the contacting means outlet 242 is moved toward the surface 250. In other words, the droplet 270 is formed with a droplet height $H_D$ before movement of the contacting means outlet 242 is ceased and before the droplet is brought into contact with the surface 250. Herein the height of the droplet $H_D$ may be defined as the greatest distance between the contacting means outlet 242 and a point in the droplet 270.

FIG. 2B illustrates the contacting means outlet 242 being stopped (e.g. movement of the contact means and contacting means outlet is ceased) at the point at which the droplet 270 contacts the surface 250. In other words, the contacting means outlet 242 is stopped above the surface 250 when the separation Y between the contacting means outlet 242 and the surface 250 is equal to the height of the droplet $H_D$ so that the droplet touches the surface; $Y=H_D$. Herein the separation Y between the surface 250 and the contacting means outlet 242 may be defined as the shortest distance between the contacting means outlet 242 and the surface 250.

FIG. 2C illustrates the droplet 270 separated from the contacting means outlet 242. The droplet 270 is attracted to and subsequently mixes with the molecules which constitute the surface 250 of the flowing liquid system. In particular, in the event that the droplet 270 touches the surface 250, inter molecular forces between: molecules of the droplet 270; and, molecules forming the surface of the liquid system; cause the droplet 270 to separate from the contacting means outlet 242 thereby leaving the droplet 270 in the liquid system.

Contact between the droplet 270 of the test substance and the surface 250 of the flowing liquid system generates a surface wave on the flowing liquid system. Contact between the droplet 270 of the test substance and the surface 250 of the flowing liquid system is illustrated in FIGS. 2B to 2C. Herein the term contact refers to the initial moment of contact between the droplet 270 and the surface 250 of the flowing liquid system and also the subsequent moments during which the droplet 270 is attracted to and eventually mixes with the surface 250 of the flowing liquid system.

In examples the flowing liquid system may comprise a bulk liquid phase and a thin film carried on the bulk liquid phase wherein the thin film: exhibits an electrical response to mechanical stress; and, exhibits a mechanical response to electrical stress. For example, the bulk liquid phase may comprise an aqueous phase and the thin film may comprise a lipid monolayer. Herein the term electrical stress refers to the stress on an object exerted by an electrical field.

In such examples, a mechanical response may be generated in response to an electrical stress exerted on the surface by the droplet. For example, a remote electromagnetic interaction may occur between molecules of the droplet and the molecules of the surface of the flowing liquid system when the droplet is moved towards the surface i.e. the remote electromagnetic interaction may occur before the droplet contacts the surface. In such examples, the remote electromagnetic interaction may generate a surface wave (e.g. a remote surface wave) on the flowing liquid system. In such examples, subsequent contact of the surface of the flowing liquid system and the droplet generates another surface wave (e.g. a contact surface wave). Both the remote surface wave and the contact surface wave may be used to determine (taken singly or together) to determine one or more properties of the test substance based on parameters of the remote surface wave and the contact surface wave.

In the examples described herein the contacting means 240 may comprise a pipette and the contacting means outlet 242 may comprise an outlet of the pipette. In examples, the contacting means may be automated. Advantageously, automating the contacting means may provide a reproducible manner in which a surface of the flowing liquid system may be contacted with a test substance and/or a reference substance. In other words, automating the contacting means may control variables such as: relative speed between the contacting means and the surface of the flowing liquid system; the volume and/or mass of a droplet.

Figure 3:
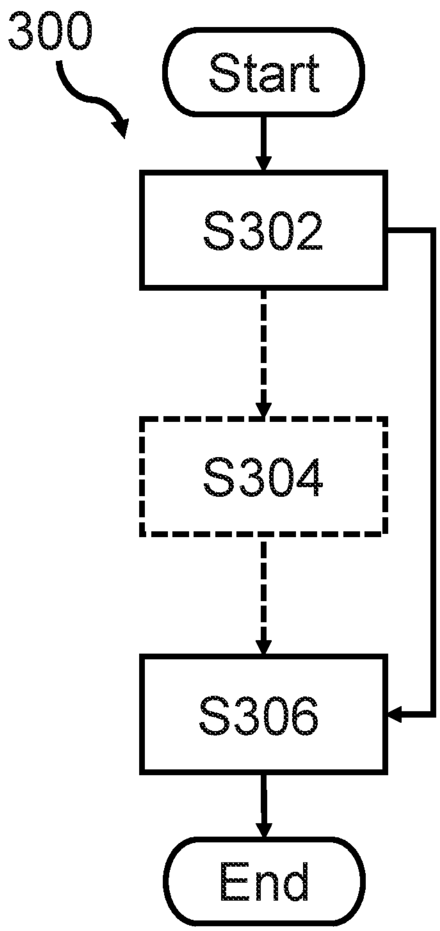
FIG. 3 illustrates a flow diagram which depicts a method of contacting a surface of a flowing liquid system with a droplet.

FIG. 3 illustrates a flow diagram which depicts a method of contacting a surface of a flowing liquid system with a droplet, for example, using the apparatus of FIGS. 2A to 2C.

The method of contacting the surface of the flowing liquid system with a droplet comprises:

Generating, S302, a droplet at a contacting means outlet of a contacting means. The droplet may comprise a reference substance or a test substance.

In examples, a droplet having a droplet height $H_D$ may be generated.

Optionally moving, S304, the contacting means outlet toward the surface of the flowing liquid system to thereby generate a surface wave (e.g. remote surface wave) in response to an electromagnetic interaction between the droplet and the surface of the flowing liquid system. In examples comprising the optional step of moving S304, the surface of the flowing liquid system carries a thin film (e.g. a lipid monolayer disposed on a bulk liquid phase comprising a aqueous phase) wherein the thin film: exhibits an electrical response to mechanical stress; and, exhibits a mechanical response to electrical stress.

Moving, S306, the contacting means outlet toward the surface of the flowing liquid system to thereby bring into contact the droplet with the surface.

In examples, movement of the contacting means outlet is stopped at a distance Y from the surface. In such examples, the distance Y may be equal to the droplet height.

In examples, the step of generating S302 and the step of moving S306 (and optionally the step of moving 304) may be performed simultaneously e.g. the droplet may be generated at the contacting means outlet whilst the contacting means outlet is moved toward the surface of the flowing liquid system. In such examples, movement of the contacting means outlet may cease when the droplet contacts the surface of the flowing liquid system.

In examples, the above method depicted by the flow diagram illustrated in FIG. 3 (e.g. S302 to S306) may be implemented by the contacting means 240 described in FIGS. 2A to 2C. In examples, the above method depicted by the flow diagram illustrated in FIG. 3 (e.g. S302 to S306) may be implemented by the contacting means 140 illustrated in FIGS. 1A to 1C.

FIGS. 4A to 4D illustrate perspective side views of a contacting means 440. FIGS. 4A to 4D illustrate a sequence of perspective side views of the contacting means 440 generating a droplet 470 and contacting a surface 450 of a flowing liquid system with the droplet 470.

The droplet 470 may comprise a reference substance or a test substance.

FIGS. 4A to 4D illustrate a contacting means outlet 442 of a contacting means 440 disposed at a separation Y from the surface 450 of the flowing liquid system. The separation Y is not changed throughout the process of contacting a droplet to the surface 450 of the flowing liquid system.

Figure 4A:
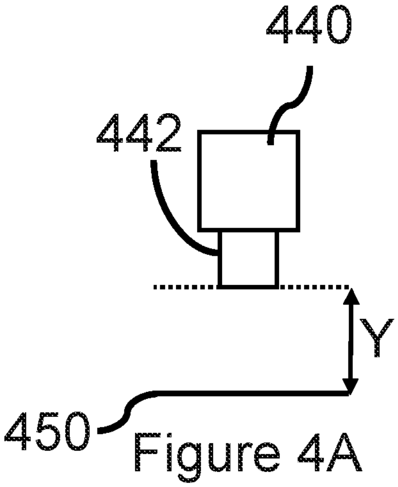
FIGS. 4A to 4D illustrate perspective side views of a contacting means, wherein the Figures illustrate a sequence of perspective side views of the contacting means generating a droplet and contacting a surface of a flowing liquid system with the droplet.
Figure 4B:
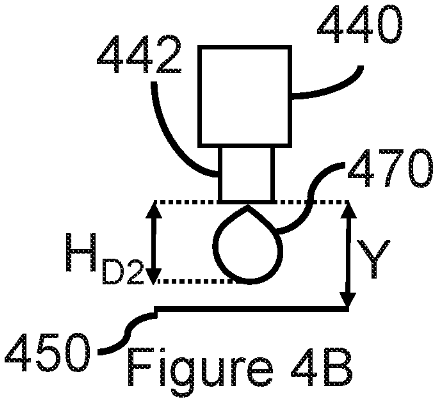
Figure 4C:
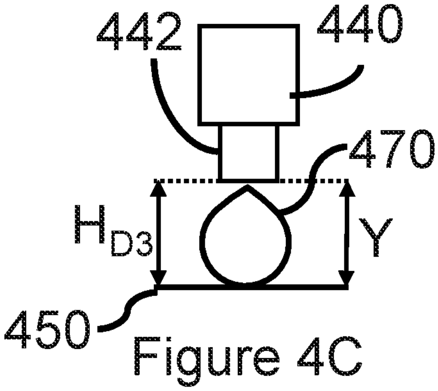

FIG. 4A to 4C illustrate the formation of droplet 470 in sequence through time. FIG. 4A illustrates the contacting means 440 and the surface 450 at a first time $t_1$, at which no droplet has yet been formed.

FIG. 4B the contacting means 440 and the surface 450 at a second time $t_2$ (later than the first time $t_1$) when a droplet 470 has been formed at the contacting means outlet 442. The droplet 470 has a droplet height $H_{D2}$ at the second time $t_2$.

Herein the separation Y between the surface 450 and the contacting means outlet 442 may be defined as the shortest distance between the contacting means outlet 442 and the surface 450. Herein the height of the droplet $H_D$ may be defined as the greatest distance between the contacting means outlet 442 and a point in the droplet 470.

FIG. 4C the contacting means 440 and the surface 450 at a third time $t_3$ (later than the second time $t_2$) when the droplet 470 has increased in size so that the droplet height is $H_{D3}$ at the third time $t_2$, wherein $H_{D3}$ is greater than $H_{D2}$; $H_{D3}>H_{D2}$.

Droplet height $H_{D3}$ is equal to the separation Y of the contacting means outlet 442 and the surface 450. When the separation Y and the droplet height are equal (e.g. $Y=H_{D3}$) then droplet 470 contacts the surface 450.

Figure 4D:
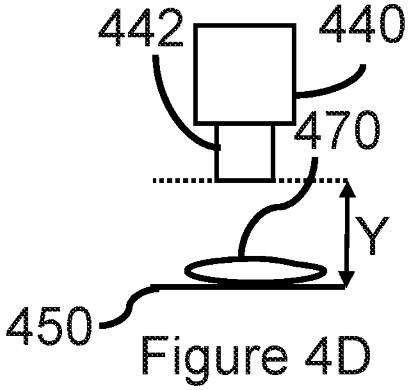

FIG. 4D illustrates the droplet 470 separated from the contacting means outlet 442. The droplet 470 is attracted to and subsequently mixes with the molecules which constitute the surface 450 of the flowing liquid system. In particular, in the event that the droplet 470 touches the surface 450, inter molecular forces between: molecules of the droplet 470; and, molecules forming the surface of the liquid system; cause the droplet 470 to separate from the contacting means outlet 442 thereby leaving the droplet 470 in the liquid system.

Contact between the droplet 470 of the test substance and the surface 450 of the flowing liquid system generates a surface wave on the flowing liquid system. Contact between the droplet 470 of the test substance and the surface 450 of the flowing liquid system is illustrated in FIGS. 4C to 4D. Herein the term contact refers to the initial moment of contact between the droplet 470 and the surface 450 of the flowing liquid system and also the subsequent moments during which the droplet 470 is attracted to and eventually mixes with the surface 450 of the flowing liquid system.

In examples the flowing liquid system may comprise a bulk liquid phase and a thin film carried on the bulk liquid phase wherein the thin film: exhibits an electrical response to mechanical stress; and, exhibits a mechanical response to electrical stress. For example, the bulk liquid phase may comprise an aqueous phase and the thin film may comprise a lipid monolayer. Herein the term electrical stress refers to the stress on an object exerted by an electrical field.

In such examples, a mechanical response may be generated in response to an electrical stress exerted on the surface by the droplet. For example, a remote electromagnetic interaction may occur between molecules of the droplet and the molecules of the surface of the flowing liquid system when the droplet is generated above the surface i.e. the remote electromagnetic interaction may occur before the droplet contacts the surface. In such examples, the remote electromagnetic interaction may generate a surface wave (e.g. a remote surface wave) on the flowing liquid system. In such examples, subsequent contact of the surface of the flowing liquid system and the droplet generates another surface wave (e.g. a contact surface wave). Both the remote surface wave and the contact surface wave may be used to determine (taken singly or together) to determine one or more properties of the test substance based on parameters of the remote surface wave and the contact surface wave.

In the examples described herein the contacting means 440 may comprise a pipette and the contacting means outlet 442 may comprise an outlet of the pipette. In examples, the contacting means may be automated. Advantageously, automating the contacting means may provide a reproducible manner in which a surface of the flowing liquid system may be contacted with a test substance and/or a reference substance. In other words, automating the contacting means may control variables such as: relative speed between the contacting means and the surface of the flowing liquid system; the volume and/or mass of a droplet.

Figure 5:
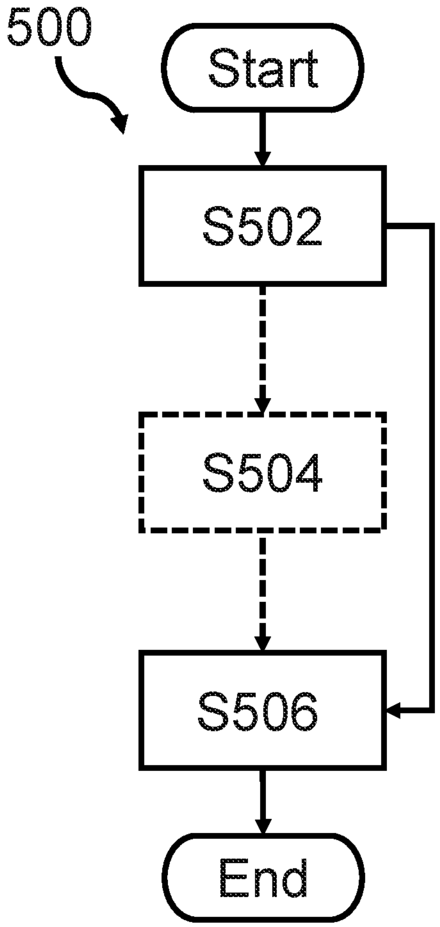
FIG. 5 illustrates a flow diagram which depicts a method of contacting a surface of a flowing liquid system with a droplet.

FIG. 5 illustrates a flow diagram which depicts a method of contacting a surface of a flowing liquid system with a droplet, for example, using the apparatus of FIGS. 4A to 4D.

The method of contacting the surface of the flowing liquid system with a droplet comprises:

Disposing, S502, a contacting means outlet of a contacting means at a given separation from the surface of a flowing liquid system. The given separation is a distance Y.

Optionally generating, S504, a droplet at the contacting means outlet to thereby generate a surface wave (e.g. remote surface wave) in response to an electromagnetic interaction between the generated droplet and the surface of the flowing liquid system. In examples comprising the optional step of generating S504, the surface of the flowing liquid system carries a thin film (e.g. a lipid monolayer disposed on a bulk liquid phase comprising a aqueous phase) wherein the thin film: exhibits an electrical response to mechanical stress; and, exhibits a mechanical response to electrical stress.

Generating, S506, a droplet at a contacting means outlet of a contacting means, wherein the droplet generated at the outlet contacts the surface of the flowing liquid system to thereby generate a surface wave in the flowing liquid system.

In examples, a droplet having a droplet height $H_D$ may be generated wherein the droplet height is equal to the given separation e.g. $Y=H_D$.

In examples, the above method depicted by the flow diagram illustrated in FIG. 5 (e.g. S502 to S506) may be implemented by the contacting means 440 described in FIGS. 4A to 4D. In examples, the above method depicted by the flow diagram illustrated in FIG. 5 (e.g. S502 to S506) may be implemented by the contacting means 140 illustrated in FIGS. 1A to 1C.

Although a plurality of contacting means and plurality of contacting methods are described herein in conjunction with a flowing liquid system, it will be appreciated that these contacting means and contacting methods may be used with a stationary (e.g. non-flowing) liquid system.

Other contacting means and methods may also be used. For example, a droplet (e.g. of a reference substance and/or a test substance) may be dropped onto the surface by being released from a height above the surface as opposed to being brought into contact by being controlled to move into contact. droplet released from a height to drop onto the surface of the liquid system can rebound, thereby generating a plurality of waves which may make a greater amount of computational work to determine parameter of the generated waves and/or a property of the dropped substance which generates the wave. An advantage with dropping the droplets onto the surface is that because it rebounds the mixing of the droplet (comprising the test substance) with the bulk liquid phase may be avoided and the surface wave excited may be indicative of only the surface properties of the droplet until the droplet breaks and mixes.

Figure 6:
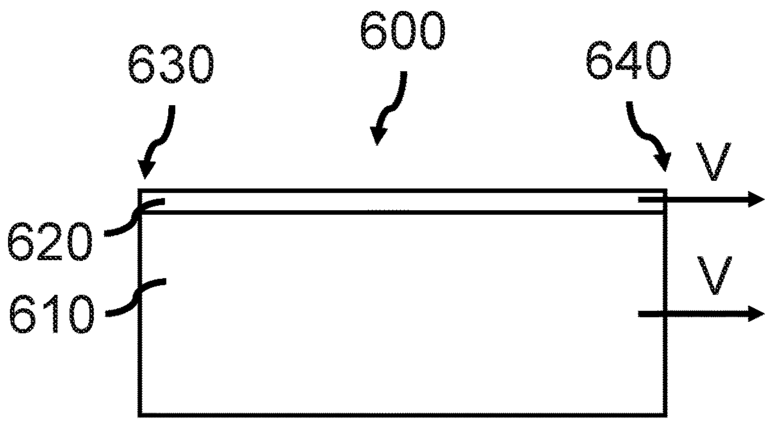
FIG. 6 illustrates a cross-sectional view of a liquid system in an analytical apparatus.

FIG. 6 illustrates a cross-sectional view of a liquid system in an analytical apparatus. FIG. 7 illustrates an analytical method using the liquid system of FIG. 6.

The liquid system 600 comprises: a bulk liquid phase 610; and, a thin film 620. The thin film 620 is carried on a surface (e.g. a top surface) of the bulk liquid phase 610. The liquid system is disposed in a trough (e.g. trough 120 illustrated in FIGS. 1A to 1C).

The bulk liquid phase 610 comprises an aqueous phase. The thin film 620 is a lipid monolayer. The lipid monolayer 620 exhibits an electrical response to mechanical stress; and, exhibits a mechanical response to electrical stress.

The liquid system is flowed by a flow provider (e.g. the flow provider comprising the arrangement illustrated in FIGS. 1A to 1C). In other words, the liquid system flows from an upstream end 630 to a downstream end 640. The bulk liquid phase 610 flows with a speed V from the upstream end 630 toward the downstream end 640. The thin film 620 flows with a speed V from the upstream end 630 toward the downstream end 640. That is the thin film 620 and the bulk liquid phase 610 flow with the same speed and in the same direction (i.e. there is no shear between the thin film and the bulk liquid phase). Close to the bottom of the vessel holding the liquid system the velocity of the liquid may be zero due to the no slip condition at the liquid vessel interface.

In examples, the flowing liquid system may be a free stream. A free stream refers to a liquid which does not need to be held in a container.

For example, a free stream may be a laminar stream that comes out of a tap and measurements can be made on the surface of said stream.

The liquid system flows under a laminar flow regime (e.g. the liquid system moves under laminar flow). For example, the speed V is sufficiently low to provide laminar flow of the system.

The analytical method 700 illustrated in FIG. 7 comprises a sequence of steps which are set out below. Steps of the method are described as discrete steps.

The liquid system may be controlled S702 an equilibrium between the lipid thin film and the lipid dispersed in the bulk liquid phase. One example of a way to control the flowing liquid system to provide this equilibrium is to control at least one of: the temperature of the flowing liquid system; the concentration of the lipid dispersed in the flowing liquid system; the pH of the flowing liquid system; and, the surface area of the lipid thin film.

For any given state of the liquid system corresponding parameters of the thin film exist. These thin film parameters can be maintained (e.g. held at a constant value) by controlling the equilibrium as above. The thin film parameter comprises any of: the surface pressure of the lipid thin film (TT) (e.g. pressure lateral to the surface of the thin film); the surface tension of the lipid thin film (y); the surface concentration of the lipid thin film (I); the surface potential of the lipid thin film (AV); the surface elastic modulus of the lipid thin film (E); capacitance of the thin film; heat capacity of the thin film.

In the manner set out above, thin film parameters are controlled to permit parameters of a surface wave (e.g. surface wave parameters) generated by a reference substance to be directly compared with parameters of a surface wave generated by a test substance.

The next step of the method is to contact, S704, the surface of the flowing liquid system with the reference substance thereby to generate a surface wave on the flowing liquid system.

The surface of the flowing liquid system may be contacted with the reference substance using one of the contacting means and/or contacting methods described herein, for example, any of those illustrated in FIGS. 2A to 2C, FIG. 3, FIG. 4A to 4D and/or FIG. 5. In examples, a droplet comprising the reference substance may be generated by any of the following methods: nebulization (e.g. using a nebulizer); cross-flowing droplet formation; flow focusing droplet formation; co-flowing droplet formation.

When the surface of the flowing liquid system is contacted by the reference substance (e.g. by a droplet of the reference substance), a surface wave is generated in the surface on the flowing liquid system. As noted above, the lipid monolayer exhibits an electrical response to mechanical stress; and, exhibits a mechanical response to electrical stress. Therefore, the surface wave generated by contacting the surface with the reference substance may comprise a combination of one or more waves generated from any of: a purely mechanical interaction between the reference substance and the surface; a purely electrical interaction between the reference substance and the surface; a piezoelectric interaction between the reference substance and the surface.

The next step of the method is to relate, S706, a property of the reference substance to a parameter of the surface wave (e.g. reference surface wave).

The step of relating a property of the reference substance to a parameter of the surface wave comprises: obtaining a property of the reference substance; measuring a parameter of the surface wave; and, associating the parameter of the surface wave with the property of the reference substance.

Obtaining a property of the reference substance comprises either: using a reference substance wherein the property is well-defined (e.g. using distilled water at a standard temperature and pressure (e.g. 273 K & 101 kPa) will have a viscosity of $10^{-3}$ Pa·s); performing a standard analytical method on the substance to obtain a property of the reference substance (e.g. using a viscometer or rheometer to determine the viscosity of the reference substance).

Measuring a parameter of the surface wave may comprise any typical method of measuring any of: wavelength of a surface wave; frequency of a surface wave; speed of a surface wave; amplitude of a wave as a function of time. For example, an optical sensor such as 150 illustrated in FIG. 1A and described herein may be used to measure the frequency of the generated wave.

Associating the parameter of the surface wave with the property of the reference substance may comprise recording the property of the reference substance and the parameter of the surface wave as a single entry in a database.

Steps S702 to S706 may be repeated for a plurality of reference substances with differing values of the property. The parameters of the reference surface waves generated by contacting the surface with different reference substances and the property of the reference substances may be used to identify a relationship between the parameters and the property (e.g. plotting a graph of the values of the property versus the parameter of the reference surface waves). A parameter of a test surface wave may be compared with the identified relationship to infer a property of the test substance.

Steps S702 to S706 may be forgone. In such examples, the parameters of reference surface waves generated by contacting a surface with each of the reference substances and the property of the reference substance may be provided electronically so that the method of steps S708 to S712 may be performed without the preceding steps. Put another way, a relationship between reference wave parameters and the property may be provided to a user or to a computing device (e.g. electronically in the form of data) and the determined parameter of a test wave generated by contacting the surface with a droplet of test substance may be compared to the relationship to thereby determine (e.g. by interpolation) a property of the test substance.

The next step of the method is to control S708 the equilibrium between the lipid thin film and the lipid dispersed in the bulk liquid phase so as to return the liquid system to the particular equilibrium which applied when the reference substance was contacted to the surface (see steps S702 and S704 above).

Controlling the equilibrium comprises controlling at least one parameter of the flowing liquid system which comprises controlling at least one of: the temperature of the flowing liquid system; the concentration of the lipid dispersed in the flowing liquid system; the pH of the flowing liquid system; and, the surface area of the lipid thin film.

The step S708 comprises returning the thin film parameters to the values which existed prior to the thin film at the surface of the bulk liquid phase being contacted with the reference substance. Therefore, the thin film parameters are controlled to permit parameters of a surface wave generated by a reference substance to be directly compared with parameters of a surface wave generated by a test substance.

Contacting, S710, the surface of the flowing liquid system with a test substance thereby to generate a surface wave (i.e. a different surface wave) on the flowing liquid system.

The surface of the flowing liquid system may be contacted with the test substance using one of the contacting means and/or contacting methods described herein, for example, any of those illustrated in FIGS. 2A to 2C, FIG. 3, FIG. 4A to 4D and/or FIG. 5. The contact between the test substance and the liquid system may be performed identically to the contact between the reference substance and the liquid system as described above in step S704.

The next step of the method is to determine, S712, a property of the test substance based on parameters of the surface wave (e.g. test surface wave).

The step of determining a property of the test substance based on parameters of the surface wave comprises: measuring a parameter of the test surface wave; and, inferring a the property of the test substance based on a comparison of the parameter of the test surface wave and the parameter(s) of the reference surface wave(s) of the property of the reference substance.

Measuring a parameter of the test surface wave may comprise any typical method of measuring any of: wavelength of a surface wave; frequency of a surface wave; speed of a surface wave. For example, an optical sensor such as 150 illustrated in FIG. 1A and described herein may be used to measure the frequency of the generated wave.

Inferring the property of the test substance based on a comparison of the parameter of the test surface wave and the parameter(s) of the reference surface wave(s) of the property of the reference substance may comprise: using the parameters of the reference surface waves and the property of the reference substances to identify a relationship between the parameter(s) and the property (e.g. plotting a graph of the property versus the parameter of the reference surface waves; comparing the parameter of the test surface wave to the identified relationship to determine an estimate of the property of the test substance.

In other examples, the liquid system may consist of a bulk liquid phase (e.g. the liquid system may not comprise a thin film such as a lipid monolayer). In such examples the bulk liquid phase may comprise water. In such examples, the above method (e.g. the steps S702 to S712) may be performed with the liquid system.

The above method is described as a series of discrete steps. However, the steps need not be discrete. The method may be performed continuously, for example, the equilibrium may be controlled on a continuous basis (e.g. using a closed feedback loop).

Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It will be appreciated by the skilled addressee having read the present disclosure that the surface of a material can have a thermodynamic potential that is independent of its volume. The physical and chemical properties of a surface may be derived, at least in part, from its thermodynamic potential. For example, the response of the surface to a mechanical perturbation is given by properties such as surface tension and lateral compressibility. Similarly, the response of the surface to an electromagnetic perturbation can be given by properties such as surface dipole moment. As a result of these perturbations, different types of surface waves may be generated on a surface e.g. a surface of a fluid (e.g. a liquid) forming an interface with another fluid (e.g. air). Some example types of surface waves are: Rayleigh waves; Gravity waves; Capillary waves; Lucassen waves. The physics of these waves have been described in *Nonlinear fractional waves at elastic interfaces* Julian Kappler, Shamit Shrivastava, Matthias F. Schneider, and Roland R. Netz *Phys. Rev. Fluids* 2, 114804—Published 20 Nov. 2017. These waves may be hydrodynamically coupled.

Rayleigh waves are characterised by elliptical motion of a notional fluid particle in a plane which is perpendicular to the surface at equilibrium and parallel to the direction of propagation of the wave.

Gravity waves are characterised by a displacement from equilibrium of a notional fluid particle at the surface wherein the displacement of the notional particle is characterised by having a restoring force of gravity or buoyancy.

Capillary waves are characterised by a displacement from equilibrium of a notional fluid particle wherein the displacement of the notional fluid particle is in a direction transverse to the surface at equilibrium and transverse to the direction of propagation of the wave and have a restoring force of surface tension.

Lucassen waves are characterised by a displacement from equilibrium of a notional fluid particle at a surface of a wave-medium by oscillation in a direction parallel to that surface at equilibrium and parallel to the direction of propagation of the wave. In Lucassen waves this notional particle is subject to a restoring force resulting from the surface elastic modulus of the surface of the wave-medium. Put another way Lucassen waves are compression-rarefaction waves which occur in the plane of a boundary (an interface) between a wave-medium and an adjacent medium such as air.

Lucassen waves can be observed in lipid monolayers and in other types of liquid systems.

Shamit Shrivastava, Matthias F. Schneider *Opto-Mechanical Coupling in Interfaces under Static and Propagative Conditions and Its Biological Implications* describes how a wave can be generated in a lipid monolayer mechanically with a dipper and how parameters of the generated wave, such as the intensity of fluorescent particles therein and the lateral pressure of the surface wave, can be measured, for example using a photo detector and a Wilhemly balance respectively.

Shrivastava S, Schneider MF. 2014 *Evidence for two-dimensional solitary sound waves in a lipid controlled interface and its implications for biological signalling. J. R. Soc. Interface* 11: 20140098 describes a method in which Lucassen waves can be generated in a lipid monolayer and how parameters of said waves may be measured (e.g. fluorescence energy transfer (FRET) measurements; a piezo cantilever). The document also describes how the state of a lipid monolayer may be characterised by a variety of thin film parameters (e.g. surface density of lipid molecules, temperature, pH, lipid-type, ion or protein adsorption, solvent incorporation, etc.) and also how the state of the lipid monolayer can affect parameters of waves which propagate in the lipid monolayer.

Bernhard Fichtl, Shamit Shrivastava & Matthias F. Schneider, *Protons at the speed of sound: Predicting specific biological signaling from physics Nature Scientific Reports* describes how Lucassen waves can be generated in a lipid interface in response to a change in pH of the system and that the speed of these waves can be controlled by the compressibility of the interface. The document describes how parameters of these waves depend on the degree of change in pH. The document also describes how mechanical and electrical changes at the lipid interface can be measured (e.g. using a Kelvin probe).

Lucassen waves may be described as interfacial compression waves and may be considered two-dimensional sound waves (sound waves confined to a surface which forms a boundary between two phases e.g. a fluid-air boundary). In a manner analogous to sound waves, shock waves may exist in Lucassen wave systems (e.g. two-dimensional shock waves). Lucassen shock waves may be characterised in the same way as Lucassen waves with the additional constraint that the waves are characterised by changes in the wave medium which are nonlinear and/or discontinuous.

S. Shrivastava, *Shock and detonation waves at an interface and the collision of action potentials, Progress in Biophysics and Molecular Biology*, describes how Lucassen shock waves may propagate through a lipid interface.

In the context of the present disclosure and the explanations of the prior research of the inventor provided herein it will be appreciated that the present disclosure provides a principle capable of broad application and describes, for the first time, the technical apparatus and methods by which such a principle may be applied in concrete technical hardware and to provide improved methods of physical measurement of technical properties of substances in a manner that was not available in any prior art previously.

For example, the flowing liquid system provides a transducer in the sense that a disturbance of one type may evoke a response of another (different) type. For example, the application of a mechanical disturbance to the surface may give rise to a corresponding electrical disturbance in response to the mechanical. The types of disturbance may relate to different types of energy for example: mechanical; electrical; magnetic; chemical.

The above types of energy may be coupled thermodynamically in any of the following ways: mechanical-electrical coupling (piezoelectric coupling or flexoelectric); mechanical-chemical coupling; mechanical-thermal coupling; mechanical-optical coupling.

The flowing liquid system may have a surface which exhibits a first response and a second response to a stimulus wherein the first response is coupled to the second response e.g. by a thermodynamic and/or hydrodynamic coupling.

The surface may comprise a film with piezoelectric properties, the first response may be an electrical response and the first stimulus may be a mechanical stress and the second response may be a mechanical response and the second stimulus may be an electrical stress (explained in more detail below). The film may be thin, for example, a self-assembled single molecule thin film of phospholipid molecules at the air-water interface.

The flowing liquid system may comprise a thin film carried on the bulk liquid phase wherein the thin film exhibits an electrical or chemical response (i.e. disturbance) to mechanical stress and vice versa, for example, piezoelectric properties such as those exhibited by liquid crystal. In other words, the thin film may: exhibit an electrical response to mechanical stress; and, exhibit a mechanical response to electrical stress. For example, the bulk liquid phase may comprise an aqueous phase and the thin film may comprise a lipid monolayer. Herein the term electrical stress refers to the stress on an object exerted by an electrical field.

The monolayer self assembles at the interface to maximize the system entropy as required by the second law of thermodynamics and is in the state of a complete or partial equilibrium. Therefore, there is an inherent thermodynamic coupling between the thermodynamic properties of the system as required by the Maxwell relations or the mixed derivatives at an entropy maximum. As a result, for example, there is a mechanical coupling in the thin film related to an electrical interaction of the molecules of the material which make up the film. Therefore, there is an inherent electromechanical coupling (resulting from the thermodynamics of the film) which exists in the film.

Perturbations to any one of the thermodynamic properties have a effect by virtue of the thermodynamic coupling as described here for a lipid thin film suspended in water: Shamit Shrivastava, Robin Cleveland, Matthias Schneider *On measuring the acoustic state changes in lipid membranes using fluorescent probes Soft Matter,* 2018, 14, 9702-9712. Therefore, in the event that a test substance is applied to the thin film mechanical, electrical or chemical part of the perturbation may be emphasised at different time scales, the corresponding waves may travel at different speeds and arrive at different times at the secondary sensor, and hence may be separated to infer a property of the test substance. In general terms in the event that a test substance is applied to the thin film there will be at least two components to the disturbance of the film, for example: one due to the mechanical effect, namely the physical disturbance resulting from the application of mechanical force; and, a second due to the perturbation of the electromechanical coupling wherein the nature of the second disturbance can be used to infer a property of the test substance.

In more detail, in the event that a test substance is applied to the thin film then the thin film will be perturbed chemically (e.g. chemical potential of the test substance with respect to insertion in the thin film, binding, or a local change in pH), thermally (release or absorption of heat due to exothermic or endothermic nature of interaction), electrically (hydrophobic or electrostatic interaction) and mechanically (surface tension gradients, steric effects). These different interactions will perturb the film at different time scales setting up propagating surface waves in the thin film. The waves therefore allow mapping of timescales of interactions into wavelengths of the propagating wave as given by the dispersion relation for the surface waves. In other words, it allows mapping temporal features of a complex interaction into spatial features. Furthermore, the dispersion allows separation of these features in space making them easier to analyse. By measuring the properties of these waves physical and chemical properties of the test substance can be inferred.

Mechanisms by which surface waves of the liquid system propagate are set out in Shamit Shrivastava *Shock and detonation waves at an interface and the collision of action potentials Prog Biophys Mol Biol.* 2021 July; 162:111-121. doi: 10.1016/j.pbiomolbio.2020.12.002.

Perturbations of the monolayer in response to an interaction with a test substance and the monolayer are indicative of the test substance, the lipid monolayer and the bulk liquid phase upon which the lipid monolayer sits. Put in other words, the surface wave resulting from said perturbations is indicative of the test substance, the lipid monolayer and the bulk liquid phase. The surface wave is characterised by parameters (e.g. amplitude, frequency, wavelength, wave speed).

Parameters of the surface wave may comprise any of: wavelength; frequency; wave speed; and amplitude. Amplitude herein may refer to: a change in surface density of particles at the surface of a liquid system (e.g. change in density of a lipid monolayer at the surface).

In other words, the surface wave is a physical mechanical wave. Parameters of a physical mechanical wave may be measured using, for example, any of: an optical sensor (e.g. such as that described herein and/or that described in Shamit Shrivastava, Matthias F. Schneider *Opto-Mechanical Coupling in Interfaces under Static and Propagative Conditions and Its Biological Implications* and other papers cited herein); an output transducer (e.g. such as that described in WO2019234437A1)

The surface wave measured may also refer to a variation in any of: surface charge, dipole moment of the surface molecules, surface potential, surface ionization or protonation, surface pressure, surface temperature. The variation of these system parameters may be referred to as a surface wave wherein the surface wave has parameters such as length; a frequency; a wave speed; and an amplitude. In this case amplitude refers to the magnitude of the surface charge, the magnitude of the dipole moment of the surface charge etc.

Parameters of these waves may be measured using, for example, any of: a temperature probe; an optical sensor. For example, the optical sensor may direct polarized light on the surface and detect polarized light reflected from the surface. Differences in polarization of the polarized light directed to the surface and of the polarized light which is reflected from the surface may be indicative of electrical phenomena on the surface (e.g. surface charge, dipole moment of the surface molecules, surface potential, surface ionization or protonation) and may be mapped to a change in a thermodynamic state of the surface.

Parameters of the surface wave may be coupled to one another. The coupling between parameters may be thermodynamic and as a result, one or multiple of these amplitudes can be measured simultaneously e.g. because the parameters are coupled. As set out above, the thermodynamic coupling may be an electro-mechanical coupling.

Examples described herein refer to a liquid system which comprises a bulk liquid phase carrying a lipid monolayer at the surface. Providing a lipid monolayer may be preferable as it functionalises the surface. That is, it provides an ordered surface the thermodynamic state of which is highly constrainable making it easy to perform a wide range of measurements (not just mechanical surface wave measurements but measurements of electrical phenomena at the surface e.g. dipole moment). However, the method and apparatus described herein are not constrained to a liquid system which comprises a bulk liquid phase carrying a lipid monolayer at the surface. For example, the methods and apparatus described herein may be equally applicable to a liquid system consisting essentially of water.

A property of a test substance may be determined based on parameters of a surface wave generated by the test substance because the nature of the interaction between the test substance and the surface of the liquid system. The interaction is a complex phenomenon because of the involvement of so many physical and chemical variables but is highly reproducible. An account of the interaction is set out below.

When the test substance is brought close to or in contact with a surface of a liquid system there is a local change of enthalpy at the surface (e.g. sometimes referred to as an local injection of enthalpy). The local change in enthalpy in the surface is coupled to the amplitude of the surface pressure wave by the following equation:

$$\Delta h - \Delta\pi(\alpha_0 + \alpha) = 0$$

Wherein:

$\Delta h$ is the change in enthalpy of the surface;

$\Delta\pi$ is the change of surface pressure of the surface;

$a_0$ is equivalent specific area for the lipid monolayer before the wave arrives a is equivalent specific area of the lipid monolayer across the wavefront The above equation is obtained using one dimensional detonation theory as described here: Shamit Shrivastava Shock and detonation waves at an interface and the collision of action potentials Prog Biophys Mol Biol 2021 July; 162:111-121. doi: 10.1016/j.pbiomolbio.2020.12.002. Epub 2021 Jan. 28.

The amount of enthalpy released when a chemical is added to the surface of the liquid system (referred to sometimes as the interface) is approximately given by its chemical potential with respect to the interface:

$$\mu_i \approx \left(\frac{\delta h}{\delta N_i}\right)_{S,\pi,N_{j\neq i}}$$

Wherein:

- $\mu_i$ is the chemical potential of the Na molecules of a species i interacting with the surface;
- $N_i$ is the number of molecules of a species i which interact with the surface;
- h is the enthalpy of the surface;
- π is the surface pressure;
- S is the entropy of the surface.

There are many variables involved in the interaction thereby making it very complex to forward model. For example, the enthalpy is not released at an instant but is released over by a variable amount over a large time period and also, the chemical potential is a result of numerous kinds of forces and interactions each having different timescales. Furthermore, for example, different lipid films have different susceptibilities for absorbing energy from the test substance at different timescales (e.g. a peak in absorption spectrum may exist that depends on the lipid and its thermodynamic state as shown here; D. B. Tata and F. Dunn Interaction of ultrasound and model membrane systems: analyses and predictions J. Phys. Chem. 1992, 96, 8, 3548-3555 Apr. 1, 1992). The above description also discounts dissipation that is unavoidable and is also distributed in time as given by the various viscosities of different components in the interaction. Finally the energy transferred from the test substance to the surface of the liquid system may partitioned between different surface wave modes (e.g. a first fraction of the energy generates Lucassen wave and a second fraction of the energy generates Rayleigh waves etc.).

It is possible to use a liquid system consists essentially of water because the fundamentally mechanism relies determining a thermodynamic state of the surface of the liquid system (and determining changes thereto), for example, based on the electric potential at the surface.

In examples, wherein the flowing liquid system consists essentially of water, the surface of the liquid system comprises an air-water interface. The air-water interface has a surface potential which can be measured (see e.g. K. Leung, *J. Phys. Chem. Lett.* 2010, 1, 2, 496-499 Publication date 28 Dec. 2009) and used to excite capillary waves electrically (see e.g. L. Cantu et al. An interferometric technique to study capillary waves, Advances in Colloid and Interface Science, Volume 247, 2017, Pages 23-32).

Put simply, energy is released from the interaction between the test substance and the surface of the flowing liquid system and this energy has to dissipate). A first fraction of the energy released may diffuse without generating a measurable wave but a second fraction of the energy released may generate a surface wave which is measurable. Of the second fraction of the energy which generates a surface wave (referred to as the propagating component), this energy is further divided into further fractions such as: a third fraction which will dissipate into the bulk liquid phase as usual sound waves; a fourth fraction which will generate a first surface wave e.g. Lucassen waves; and, a fifth fraction which will generate a second surface wave (e.g. a Rayleigh waves) etc. The partition of the energy into the above components will be determined by various rules dependent on the compressibility and viscosities of the two media (e.g. the air and water).

In examples wherein the flowing liquid system consists of a bulk liquid phase and does not comprise a thin film (e.g. a flowing liquid system consisting essentially of water) the interface (surface of the liquid system forming the air-liquid interface) is quite incompressible and, therefore, less energy may partition into bulk liquid phase as typical sound waves in comparison to the amount of energy which generates surface waves (e.g. capillary modes).

The liquid system need not comprise any thin film. For example, the methods described herein may be performed with a thin film such as a lipid monolayer or without a thin film at all (e.g. with just a bulk liquid phase). The methods described herein may be performed using an analytical apparatus such as that illustrated in FIG. 1A to 1C or by utilising or retrofitting existing apparatus such as a Langmuir trough.

The term laminar flow herein refers to a flow of a liquid system wherein the Reynold number, Re, of the liquid system (which is proportional to the volumetric flow rate of the liquid system) is sufficiently low in order to prevent turbulent flow phenomena from occurring in the liquid system (e.g. vortex shedding etc.). For example, a sufficiently low volumetric flow of the liquid system may be provided to thereby provide a laminar flow of the liquid system. For example, the volumetric flow of the liquid system may be provided which provides a Reynolds number less than or equal to 2000, or more preferably less than or equal to 1800.

Parameters of the liquid system which may be controlled to provide a laminar flow may include any of: the dimensions of the trough which holds the liquid system (e.g. depth; length; width); the volumetric flow rate of the liquid system; the speed of the fluid (e.g. mean speed); the dynamic viscosity of the liquid system μ; v the kinematic viscosity of the fluid, the density of the fluid p.

Herein the term aqueous phase refers to any liquid comprising water.

Herein the term lipid monolayer may refer to a single layer of lipid molecules arranged on a surface of an aqueous phase wherein a hydrophilic end of each of the lipid molecules is disposed in the aqueous phase to thereby provide a layer of lipid molecules orientated in a like manner.

Herein the term lipid monolayer may refer to a single layer of lipid molecules arranged on a surface of an aqueous phase wherein a hydrophilic end of each of the lipid molecules is disposed in the aqueous phase to thereby provide a layer of lipid molecules orientated in a like manner.

The chemical constituents (e.g. the species) and/or properties of the lipid monolayer and the bulk liquid phase may be known and used to infer the chemical constituents and/or properties of the test substance based on parameters of the wave.

The methods described herein may comprise contacting a surface of the liquid system with a test substance to modify a wave propagation property of the surface. The test substance may be provided in a series of droplets, contact being provided between each droplet and the surface in a sequence.

Successive droplets in the sequence may further modify a wave propagation property of the surface e.g. as the sequence proceeds the modification provided by the droplets may be cumulative.

The method may comprise determining the property of the test substance based on the parameter of the surface wave and an indication of a quantity of the test substance delivered to the surface such as a number and/or rate of droplet delivery and/or a timeseries of droplet delivery data indicating the quantity of test substance delivered to the surface over time.

The method may comprise determining the property of the test substance based on a parameter of the surface wave and an indication of the flow rate of the flowing liquid system such as an indication of the volumetric flow rate of the flowing liquid system, such as the speed V (e.g., mean speed) of flow the flowing liquid system.

The method may comprise determining the property of the test substance based on a parameter of the surface wave and the indication of a quantity of the test substance delivered to the surface. For example, the property of the test substance can be determined in part based on a phase of the surface wave.

The method may comprise determining the property of the test substance based on: a parameter of the surface wave; an indication of the flow rate of the flowing liquid system; and/or, the indication of a quantity of the test substance delivered to the surface. For example, as the test substance is flowed by the surface, the presence or absence of the test substance can impact a parameter of the surface wave, thereby impacting a detectable property of the surface wave.

The method may comprise: providing contact between the surface of the flowing liquid system and a test substance at a first flow rate of the flowing liquid system thereby to generate a first surface wave on the flowing liquid system; modulating the flow rate to comparatively increase or decrease the flow rate; providing contact between the surface of the flowing liquid system and the test substance at a second flow rate, different from the first flow rate thereby to generate a second surface wave on the flowing liquid system, and determining the property of the test substance based on the first surface wave and the second surface wave.

Such methods may comprise determining a parameter of the first surface wave and a parameter of the second surface wave.

The determining of the property of the test substance based on the first surface wave and the second surface wave may comprise determining the property based on the parameter of the first surface wave and the parameter of the second surface wave.

The determining the of property of the test substance based on said surface waves may be further based on an indication of a quantity of the test substance delivered to the surface as outlined above.

For example, a parameter of a plurality of waves may be obtained wherein each of the waves was generated during a different flow rate, and the method may comprise determining the property of the test substance based on the parameters of each of the plurality of surface waves obtained during different flow rates of the flowing liquid system and based on an indication of the respective flow rates and optionally further based on an indication of a quantity of the test substance delivered to the surface as outlined above.

In examples, the method may comprise determining the property of the test substance based on a parameter of the surface wave and an indication of the surface area of the flowing liquid system. In examples, the apparatus may comprise a means for adjusting the surface area of the flowing liquid system. For example, a composition of a membrane (e.g., an amount of sterols in a lipid bilayer) can be tuned to provide a predetermined mechanical property of the membrane.

The analytical methods of the present disclosure provide methods of characterising a chemical stimulus. Such a chemical stimulus may be provided by a test substance, which may be characterised by determining a property of that test substance. In addition, characterising a chemical stimulus may provide other information about that stimulus including for example information encoded in the response of the flowing liquid system to that stimulus.

A stimulus of the flowing liquid system, such as a chemical stimulus, may encode a data input. The interaction between the stimulus and the flowing liquid system may provide a model of a data operation performed on that data input. The response of the flowing liquid system to that stimulus (e.g., the resultant surface wave and/or the feature vector for that surface wave) provides a data output from that operation e.g., the result of applying that data operation to that data input.

An aspect of the disclosure provides an analytical method using surface waves on a flowing liquid system to characterise a stimulus of a liquid system, the analytical method comprising:

- providing the stimulus thereby to generate a surface wave on the flowing liquid system;
- determining a parameter of the surface wave; and,
- characterising said stimulus based on the parameter of the surface wave.

The stimulus may be a chemical stimulus and providing the stimulus may comprise contacting the surface of the flowing liquid system with a substance, wherein the chemical stimulus modifies a wave propagation property of the surface.

The method may further comprise determining a mapping from the chemical stimulus to the parameter of the surface wave thereby to characterise the chemical stimulus.

In examples, characterising said chemical stimulus based on the parameter of the surface wave may comprise determining a characteristic of the chemical stimulus based on the parameter of the surface wave.

As alluded to above the stimulus may encode data e.g. the chemical stimulus may be indicative of data. The chemical stimulus may encode input data e.g. input data for transformation by one or more operations into output data (e.g. mathematical operations). For example said transformations being performed by the flowing liquid system and its physical interaction with that stimulus.

In examples, the liquid system may be configured to perform one or more operations (e.g. mathematical operations) on the input data encoded by the chemical stimulus to provide output data encoded by the parameter of the surface wave.

For example, liquid system may be configured to perform one or more operations based on the thermodynamic parameters of the liquid system e.g. the thermodynamic parameters of the liquid system may determine the operations the liquid system performs on the input data.

An aspect of the disclosure provides an analytical apparatus comprising: a trough configured to hold a liquid system; a flow provider configured to provide a flow of the liquid system from an upstream end of the trough to a downstream end of the trough to thereby provide a flowing liquid system. The flow provider may be configured to provide a laminar flow of the liquid system.

The analytical apparatus may comprise a stimulus provider configured to apply a stimulus to the flowing liquid system.

The stimulus provider may comprise electrodes spatially arranged, relative to the trough, to apply electrical stimulus to the surface of the flowing liquid system e.g. the stimulus provider is configured to apply an electrical stimulus to the flowing liquid system. The stimulus may comprise a voltage or current signal. Such signals may be time varying and may have a selected frequency characteristic (e.g. the electrodes may be connectable to an electrical signal generator).

The electrodes may be spatially arranged, relative to the trough, to provide the electrical signal, for example to provide a voltage difference between two points of the surface of the flowing liquid system e.g., an electric field directed along the surface of the flowing liquid system. For example, the electrodes may be spaced apart along the surface of the liquid.

In addition, or as an alternative, the electrodes may be spatially arranged, relative to the trough, to provide a signal transverse to the surface (e.g., through the plane of the surface). For example, at least one of the electrodes may be disposed contacting the top of the surface while another is provided below the surface, immersed in the liquid.

Where a chemical stimulus is used, the stimulus provider may comprise a contacting means. The contacting means may comprise a liquid dispenser having a conduit for delivering a liquid to the flowing liquid system. The conduit may be sized and arranged, relative to the trough, for delivering droplets of the liquid to the surface of the flowing liquid system.

According to some aspects, a method for determining a property of a test substance. The method may comprise first encoding the test substance as a wave through a non-solid medium by chemical excitation before processing the wave through the non-solid medium, wherein the processing modifies one or more features of the wave into one or more processed wave features according to one or more conditions of the non-solid medium. The one or more processed wave features are decoded to determine one or more features of the test substance.

The test substance may be encoded as a wave through the non-solid medium by chemical excitation by contacting the test substance to the surface of the non-solid medium, thereby generating a wave on the surface of the non-solid medium. According to some aspects, the test substance with an analyte to enhance or inhibit interactions with the non-solid medium before contacting the test substance with the non-solid medium.

The non-solid medium may comprise a bulk non-solid phase. According to some aspects, the bulk non-solid phase comprises a lipid, protein, or other molecule dispersed in the bulk non-solid phase.

The bulk non-solid phase may comprise thermo-fluid properties to distribute the wave as a particular combination of one or more of Lucassen, capillary, gravity, and Rayleigh waves. In another aspect, bulk non-solid phase comprises thermo-fluid properties to store energy in a non-equilibrium state.

The bulk non-solid phase may be in a state of flow, a state of laminar flow, or not in a state of flow according to some aspects. The non-solid medium may comprise a thin film on the bulk non-solid phase, which may be a monolayer of lipids, protein, or other molecules. According to some aspects, the thin film exhibits an electrical response to mechanical stress and vice versa.

The wave may be processed through the non-solid medium comprises modifying a shape of a trough through which the wave propagates, resulting in the processed wave features having one or more of a controlled dissipation, dispersion, refraction, or reflection according to some aspects. The wave may also be processed through the non-solid medium comprises manipulating one or more thermo-fluid properties of the bulk non-solid phase spatiotemporally to filter or enhance one or more wave modes as the wave propagates across the non-solid medium. In some aspects, thermo-fluid properties of the non-solid medium may be manipulated spatiotemporally by changing the chemical composition of the bulk non-solid with a flow system and/or by a spatial light modulator interacting with the interface photochemically, photothermally, or photomechanically.

The wave may also be processed through the non-solid medium to modify one or more of a frequency, a phase, an amplitude, or other wave modes by modifying one or more features of the bulk non-solid, such as elasticity or compressibility of the surface directly related to wave speed, elasticity of the bulk media, nonlinearity of elasticity, and viscosity.

One or more of the processed wave features may then be detected by an apparatus as a distribution of energy among one or more wave modes of the processed wave features as time series data. According to some aspects, the apparatus may be a piezoelectric device the or a photodetector.

The distribution of energy among one or more wave modes of the processed wave features may then be processed as time series data on a computer to determine the feature of the test substance. It will be appreciated in the context of the foregoing disclosure that the described embodiments are not to be construed as limiting. For example, where ranges are recited these are to be understood as disclosures of the limits of said range and any intermediate values between the two limits. As another example, with reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality of the controllers and processing means described herein (such as the processor which may be used to determine feature vectors of the surface wave) may be provided by mixed analogue and/or digital processing and/or control functionality. It may comprise any general purpose processor, which may be configured to perform a method according to any one of those described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide computer program products such as tangible, non-transitory storage media comprising program instructions operable to program a processor to perform any one or more of the methods described and/or claimed herein and/or to provide data processing apparatus as described and/or claimed herein. Such a controller may comprise an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. These claims are to be interpreted with due regard for equivalents.

The invention claimed is:

1. An analytical method using surface waves on a flowing liquid system for determining a property of a test substance, the analytical method comprising:

contacting the surface of the flowing liquid system with the test substance thereby to generate a surface wave on the flowing liquid system;

determining a parameter of the surface wave; and determining the property of the test substance based on a parameter of the surface wave.

2. The analytical method of claim 1 wherein:

the flowing liquid system comprises a bulk liquid phase.

3. The analytical method of claim 2 wherein:

the flowing liquid system comprising a thin film carried on the bulk liquid phase wherein the thin film exhibits an electrical response to mechanical stress and vice versa.

4. The analytical method of claim 3 wherein:

the thin film is a monolayer.

5. The analytical method of claim 3 wherein:

the thin film is a lipid thin film.

6. The analytical method of claim 2 wherein:

the bulk liquid phase comprises an aqueous phase.

7. The analytical method of claim 6 wherein:

the flowing liquid system comprises a lipid dispersed in the bulk liquid phase.

8. An analytical apparatus for determining a property of a test substance using surface waves, the analytical apparatus comprising:

a trough configured to hold a flowing liquid system; and a detector configured to detect parameters of a surface wave generated by contacting the surface of the flowing liquid system with the test substance, wherein the apparatus is configured to determine the property of the test substance based on the parameters of the surface wave.

9. The analytical apparatus of claim 8 wherein:

comprising a flow provider configured to provide a flow of the liquid system from an upstream end of the trough to a downstream end of the trough.

10. The analytical apparatus of claim 9 wherein:

the trough is configured to hold a liquid system comprising:

a bulk liquid phase;

a lipid dispersed in the bulk liquid phase; and, a lipid thin film carried at the surface of the bulk liquid phase;

and, the analytical apparatus comprises:

an equilibrium controller configured to control an equilibrium between the lipid thin film and the lipid disposed in the bulk liquid phase.

11. The analytical apparatus of claim 10 wherein:

the equilibrium controller comprises at least one of:

(i) a heater configured to heat the liquid system disposed in the trough; and (ii) a liquid system dispenser configured to dispense liquid into the trough to modify the liquid system.

12. The analytical apparatus of claim 8 comprising:

a liquid dispenser comprising a conduit for dispensing the test substance and being configured to contact the surface of the liquid system with the test substance.

13. The analytical apparatus of claim 12 wherein:

the liquid dispenser is configured to:

(a) generate a droplet of the test substance at an outlet of the liquid dispenser; and, (b) move the outlet toward the surface of the flowing liquid system to thereby bring into contact the droplet of the test substance and the surface.

14. The analytical apparatus of claim 12 wherein:

the liquid dispenser is configured to:

(c) generate a droplet of the test substance at an outlet of the liquid dispenser;

wherein, the outlet is spaced from the surface of the liquid system so that, in the event that a droplet is generated at the outlet, part of the droplet contacts the surface.

15. A method for determining a property of a test substance comprising:

(a) encoding the test substance as a wave through a non-solid medium by chemical excitation;

(b) processing the wave through the non-solid medium, wherein the processing modifies one or more features of the wave into one or more processed wave features according to one or more conditions of the non-solid medium; and (c) decoding the one or more processed wave features to determine one or more features of the test substance.

16. The method of claim 15, wherein the test substance is encoded as a wave through the non-solid medium by chemical excitation by contacting the test substance to the surface of the non-solid medium, thereby generating a wave on the surface of the non-solid medium.

17. The method of claim 16, further comprising mixing the test substance with an analyte to enhance or inhibit interactions with the non-solid medium before contacting the test substance with the non-solid medium.

18. The method of claim 15, wherein:

the non-solid medium comprises a thin film on the bulk non-solid phase.

19. The method of claim 18, wherein processing the wave through the non-solid medium comprises manipulating one or more thermo-fluid properties of the bulk non-solid phase spatiotemporally to filter or enhance one or more wave modes as the wave propagates across the non-solid medium.

20. The method of claim 15 wherein processing the wave through the non-solid medium comprises modifying a shape of a trough through which the wave propagates, resulting in the processed wave features having one or more of a controlled dissipation, dispersion, refraction, or reflection.

* * * * *